United States Patent [19]

Shiraishi et al.

[11] Patent Number: 4,941,793
[45] Date of Patent: Jul. 17, 1990

[54] SYSTEM FOR SENDING-OFF PRESS-FORMED PARTS

[75] Inventors: Motoatsu Shiraishi; Masaru Sasagawa; Ken Tazo; Masaaki Kubota; Shinji Katayama, all of Sayama, Japan

[73] Assignee: Honda Giken Kogyo Kabushiki Kaisha, Tokyo, Japan

[21] Appl. No.: 286,908

[22] Filed: Dec. 20, 1988

[30] Foreign Application Priority Data

Dec. 21, 1987 [JP] Japan .................................. 62-323493
Jan. 13, 1988 [JP] Japan ...................................... 63-5456

[51] Int. Cl.$^5$ ............................................. B65H 31/00
[52] U.S. Cl. ..................................... 414/225; 72/404; 72/426; 198/458
[58] Field of Search .............. 100/207, 193, 140, 137; 414/222, 225; 198/458, 468.3; 72/404, 426

[56] References Cited

U.S. PATENT DOCUMENTS

| | | | |
|---|---|---|---|
| 3,609,843 | 10/1971 | Fiegel, Jr. et al. | 414/222 X |
| 3,987,889 | 10/1976 | Godoy | 198/458 X |
| 4,480,953 | 11/1984 | Baba | 414/793.7 X |
| 4,536,118 | 8/1985 | Baba | 198/458 X |
| 4,550,588 | 11/1985 | Abe et al. | 72/404 X |
| 4,580,964 | 4/1986 | Repella | 414/225 X |
| 4,600,349 | 7/1986 | Vogt | 414/225 |

Primary Examiner—Robert J. Spar
Assistant Examiner—James T. Eller, Jr.
Attorney, Agent, or Firm—Armstrong, Nikaido, Marmelstein, Kubovcik & Murray

[57] ABSTRACT

In a system for removing press-formed parts formed in a pressing machine, a loading transfer device is disposed between an ejection position to which a plurality of press-formed parts are simultaneously ejected in parallel from the pressing machine and a loading position established to load the press-formed parts onto each of a plurality of carrier pallets which are on standby in parallel to individually correspond to the plurality of press-formed parts. The loading transfer device comprises a plurality of transfer pallets connected to one another with variable spacings therebetween and reciprocally movable in parallel between the ejection position and the loading position so that the plurality of press-formed parts may be placed onto the individual transfer pallets, and a spacing-varying drive device for varying the spacing between the transfer pallets. During transferring of the press-formed parts by the loading transfer device, the spacing between the press-formed parts is varied.

6 Claims, 22 Drawing Sheets

SYSTEM FOR SENDING-OFF PRESS-FORMED PARTS

BACKGROUND OF THE INVENTION

1. Field of the Invention

The present invention relates to a system for sending-off press-formed parts produced in a pressing machine.

2. Description of the Prior Art

Such systems are known, for example, from Japanese Patent Application Laid-open Nos. 62-83970, published Apr. 17, 1987 and 61-226499, published Oct. 8, 1986 and U.S. Pat. Nos. 4,480,953 and 4,536,118.

The above prior art systems are intended to send-off press formed parts ejected one by one from a pressing machine, but a plurality of press formed parts can be formed in the pressing machine. In this case, to efficiently send-off the press-formed parts ejected by a plurality at a time from the pressing machine, it is considered to transport the plurality of press-formed parts ejected in parallel from the pressing machine while being left in parallel to send-off them. However, dies for simultaneously forming a plurality of press-formed parts in the pressing machine are commonly arranged with decreased spacings between sections for forming the individual press-formed parts to reduce the size of the pressing machine and improve the yield of blanks. Therefore, the plurality of press formed parts are ejected to an ejection position with a reduced spacing between one another. On the contrast, carrier pallets used to transport out the press-formed parts loaded thereon must be on standby with a relatively large spacing between each other, because a separator is provided to avoid any interference between the press formed parts, and a positioning pin is provided to improve the accuracy of taking-out in the subsequent step. Thus, the spacing between adjacent ones of a plurality of carrier pallets which are on standby ready for loading the press-formed parts thereonto is larger than the spacing between the plurality of press-formed parts simultaneously ejected from the press machine and hence, it is necessary to adjust the difference in such spacings.

SUMMARY OF THE INVENTION

The present invention has been accomplished with such circumstances in view, and it is an object of the present invention to provide a system for sending-off press-formed parts, herein a plurality of press-formed parts ejected from a pressing machine can be efficiently loaded onto each of a plurality of carrier pallets which are standby at spaced apart distances larger than the spacing between the press-formed parts.

To attain such object, according to the present invention, loading transfer means is disposed between an ejection position to which a plurality of press formed parts are simultaneously ejected In parallel from the pressing machine and a loading position established to load the press-formed parts onto each of a plurality of carrier pallets which are standby in parallel to individually correspond to a plurality of the press-formed parts, and the loading transfer means comprises a plurality of transfer Pallets connected to one another with mutual variable spacings and reciprocally movable in parallel between the ejection position and the loading position so that the plurality of press-formed parts may be placed onto the individual transfer pallet, and spacing-varying drive means for varying the spacing between the transfer pallets.

With the above construction, a plurality of press-formed parts can be simultaneously transported while varying the spacing between one another so that such spacings in the ejection position and in the loading position are different, leading to a facilitated loading operation in the loading position.

According to another aspect of the present invention, there are established an ejection position to which a plurality of press-formed parts are simultaneously ejected in parallel from the pressing machine, a loading position in which a plurality of press-formed parts are to be loaded onto each of a plurality of carrier pallets which are on standby in parallel and individually in correspondence to the press-formed parts, and a reloading position at a central portion between the ejection position and the loading position. Loading transfer means is disposed between the ejection position and the loading position and includes a pair of transfer pallets which are operatively connected to each other so that when one of the transfer pallets is in the ejection position or in the reloading position, the other transfer pallet is in the reloading position or in the loading position, and onto each of which a plurality of press-formed parts can be loaded in parallel. Additionally, reloading means is disposed in the reloading position for raising and lowering the press-formed parts on the transfer pallet while releasably holding them with a variable spacing therebetween.

With such construction, reloading of the press-formed parts by the reloading means in the reloading position enables the plurality of press formed parts to be simultaneously transported with the mutual spacings varied in the ejection position and in the loading position, leading to a facilitated loading operation in the loading position.

The above and other objects, features and advantages of the invention will become apparent from a reading of the following description of the preferred embodiments, taken in conjunction with the accompanying drawings.

BRIEF DESCRIPTION OF THE DRAWINGS

FIGS. 1 to 9 illustrate a first embodiment of the present invention, wherein

FIG. 1 is a longitudinal sectional side view of an entire sYstem of the first embodiment;

FIG. 2 is a cross-sectional plan view of the system shown in FIG. 1;

FIG. 3 is an enlarged view of an essential portion shown in FIG. 2;

FIG. 4 is a plan view of transporting means;

FIG. 5 is a view taken along a line V—V in FIG. 4;

FIG. 6 is an enlarged view taken along an arrow VI in FIG. 4;

FIG. 7 is an enlarged sectional view taken along a line VII—VII in FIG. 5;

FIG. 8 is an enlarged perspective view of a carrier pallet: and

FIG. 9 is a diagram illustrating a path described when a press-formed part is loaded onto the carrier pallet;

FIGS. 10 to 12 illustrated a second embodiment of the present invention, wherein FIG. 10 is a longitudinal sectional side view of loading transfer means and transporting means;

FIG. 11 is a sectional view taken along a line XI—XI in FIG. 10; and

FIG. 12 is a view taken along an arrow XII in FIG. 10;

FIGS. 13 to 19 illustrate a third embodiment of the present invention, wherein

FIG. 13 is a longitudinal sectional side view of loading transfer means and transporting means when a small-sized press-formed part is transported;

FIG. 14 is a sectional view taken along a line XIV—XIV in FIG. 13:

FIG. 15 is a view taken along an arrow XV in FIG. 13;

FIG. 16 is a partially enlarged longitudinal section side view of a carrier pallet;

FIG. 17 is a longitudinal sectional view similar to FIG. 13 but when a large-sized press-formed part is transported;

FIG. 18 is a sectional view taken along a line XVIII—XVIII in FIG. 17; and

FIG. 19 is a view taken along an arrow XIX in FIG. 17; and

FIGS. 20 to 23 illustrate a fourth embodiment of the present invention, wherein

FIG. 20 is a longitudinal sectional side view of an entire system of the fourth embodiment;

FIG. 21 is a plan view of the system shown in FIG. 20;

FIG. 22 is an enlarged longitudinal sectional side view of an essential portion shown in FIG. 20; and FIG. 23 is a sectional view taken along a line XXIII—XXIII in FIG. 22.

DESCRIPTION OF THE PREFERRED EMBODIMENTS

The present invention will now be described by way of embodiments with reference t the accompanying drawings.

Figure 1:
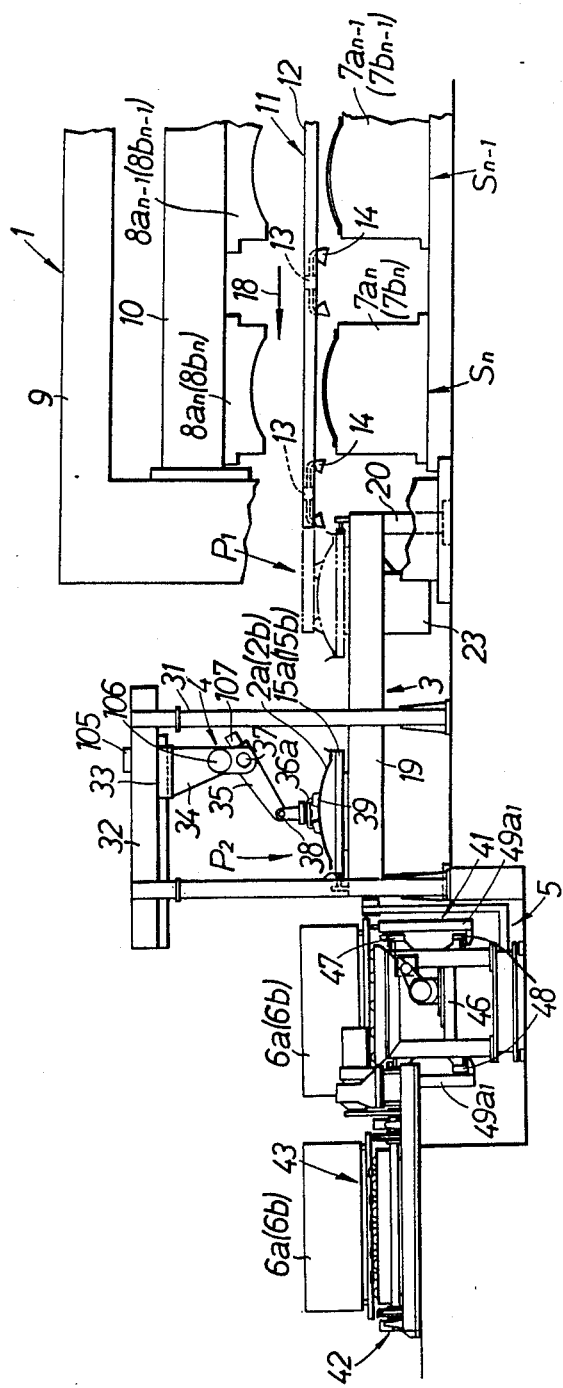
Figure 2:
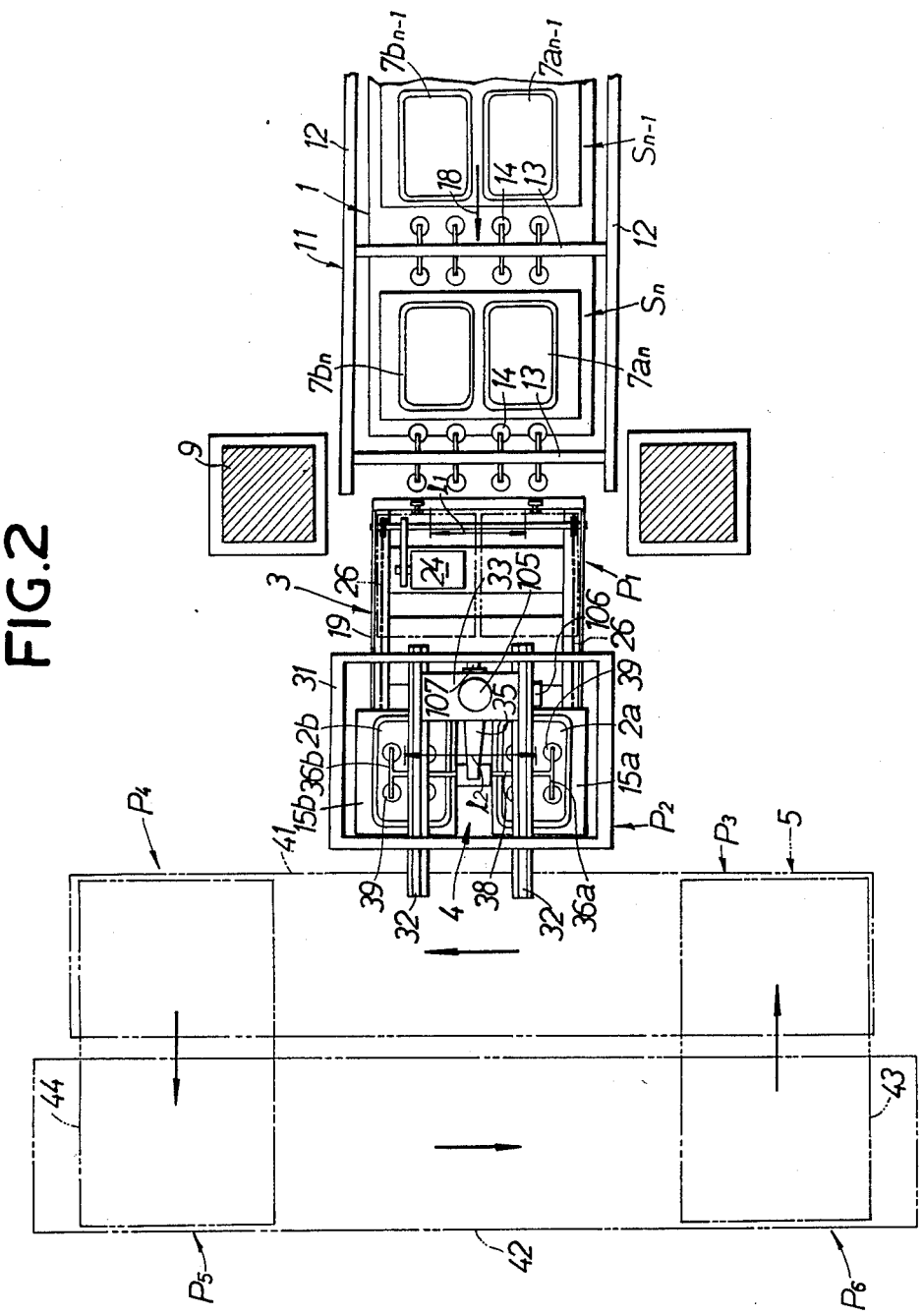

First, a first embodiment of the present invention will be described below with reference to FIGS. 1 to 9. Referring to FIGS. 1 and 2. press-formed parts $2a$ and $2b$ obtained from simultaneous press-forming by plural numbers. e.g.. twos in a continuously pressing machine 1 are simultaneously ejected in parallel to an ejection position $P_1$ and transferred in sequence, while maintaining the parallel condition, from the ejection position $P_1$ to a loading position $P_2$ by loading transfer means 3. The press-formed parts $2a$ and $2b$ reaching the loading position $P_2$ are loaded into carrier pallets $6a$ and $6b$ on standby in parallel on transporting means 5 by loading means 4 and transported out by the transporting means B.

The continuously pressing machine 1 has a plurality of forming stations $S_n$, $S_{n-1}$,—established therein at uniform distances in a transferring direction, and lower dies $7a_n$, $7a_{n-1}$,—, $7b_n$, $7b_{n-1}$,—and upper dies $8a_n$, $8a_{n-1}$,—and $8b_n$, $8b_{n-1}$,—are disposed respectively by two sets in the forming stations $S_n$, $S_{n-1}$,—for press-forming thin steel plate in cooperation. The individual upper dies $8a_n$, $8a_{n-1}$,—and $8b_n$, $8b_{n-1}$,—are fixedly mounted on a lift base liftably supported on a support 9.

The continuously pressing machine 1 includes transfer means 11 added thereto for sequentially moving the thin steel plates between the forming stations $S_n$, $S_{n-1}$,—. The transfer means 11 comprises a pair of transfer bars 12 and 12 disposed in parallel to the transferring direction 18 on opposite sides of the forming stations $S_n$, $S_{n-1}$,—, a plurality of arms 13 mounted to extend between the both transfer bars 12, and handling mechanisms 14 mounted on each of the arms 13 for releaseably holding the thin steel plates and the press-formed parts $2a$ and $2b$.

Such transfer means 11 is designed so that the arms 13 and the handling mechanisms 14 are left standby between the individual forming stations $S_n$, $S_{n-1}$,—during press-forming by the lower dies $7a_n$, $7a_{n-1}$,—and $7b_n$, $7b_{n-1}$,—and the upper dies $8a_n$, $8a_{n-1}$,—and $8b_n$, $8b_{n-1}$, and the thin steel plates can be sequentially transferred between the adjacent forming stations $S_n$, $S_{n-1}$,—when the upper dies $8a_n$, $8a_{n-1}$,—and $8b_n$, $8b_{n-1}$—are raised. The press-formed parts $2a$ and $2b$ resulting from press-forming in the forming station $S_n$ located at the most upstream end as viewed in the transfering direction 18 are ejected to the ejection position $P_1$ established in front of the forming station $S_n$ at the same distances as the forming stations $S_n$, $s_{n-1}$, by the transfer means 11.

The transporting means 15 is disposed to extend in a direction perpendicular to the transferring direction 18 across the loading position $P_2$ established at a place in front of the continuously pressing machine 1 in the transfering direction 18, and the ejection position $P_1$ and the loading position $P_2$ are established on one straight line extending toward the transferring direction 18.

Figure 3:
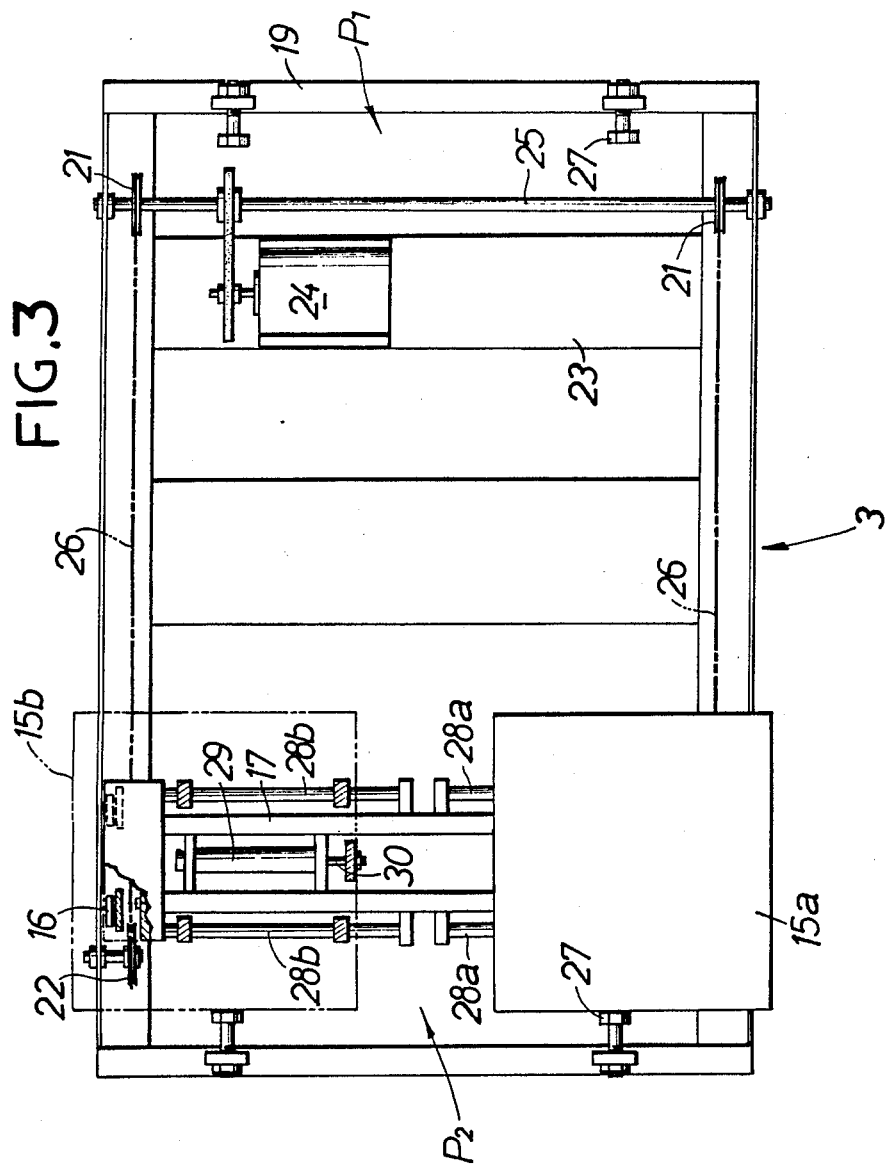
Figure 4:
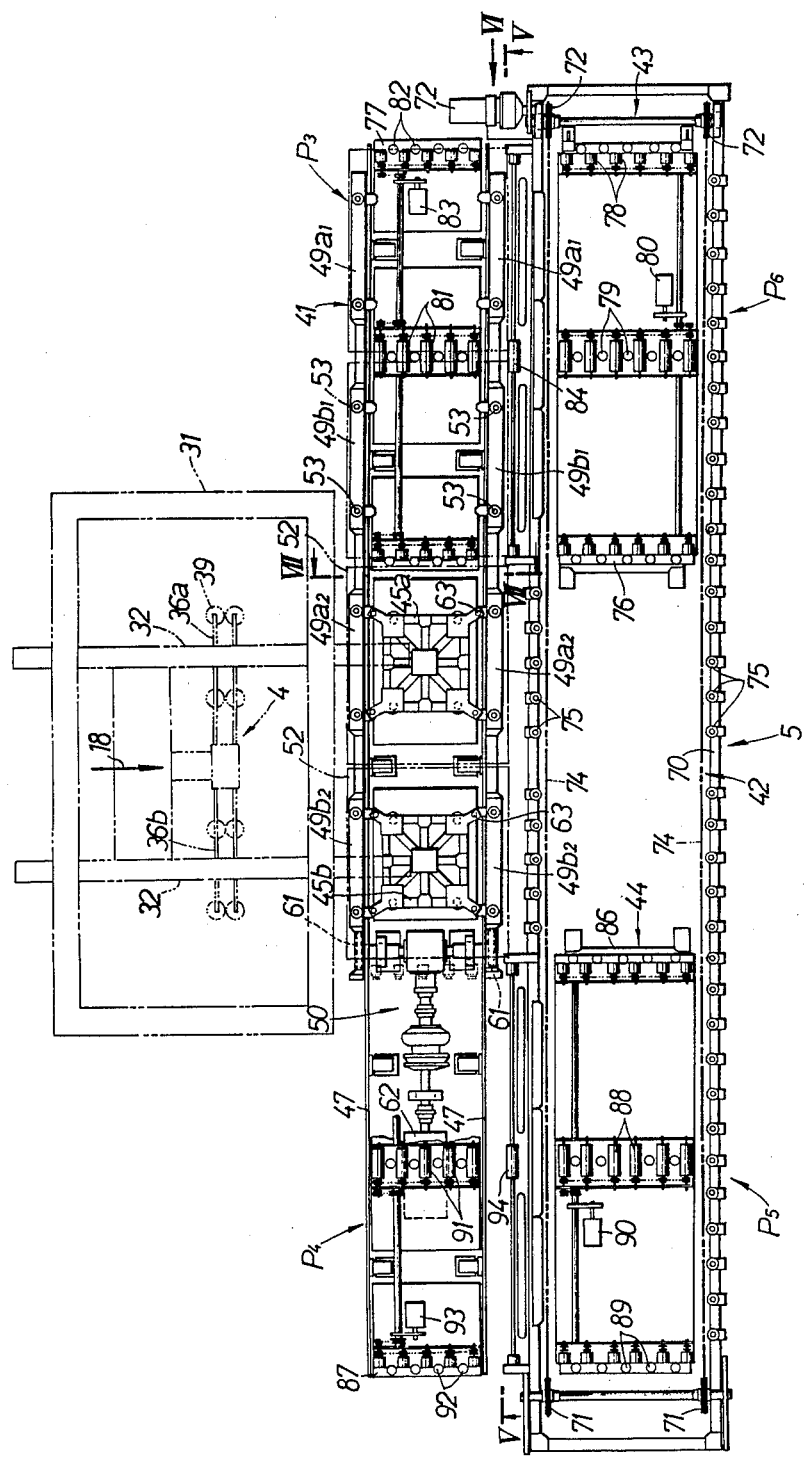
Figure 5:
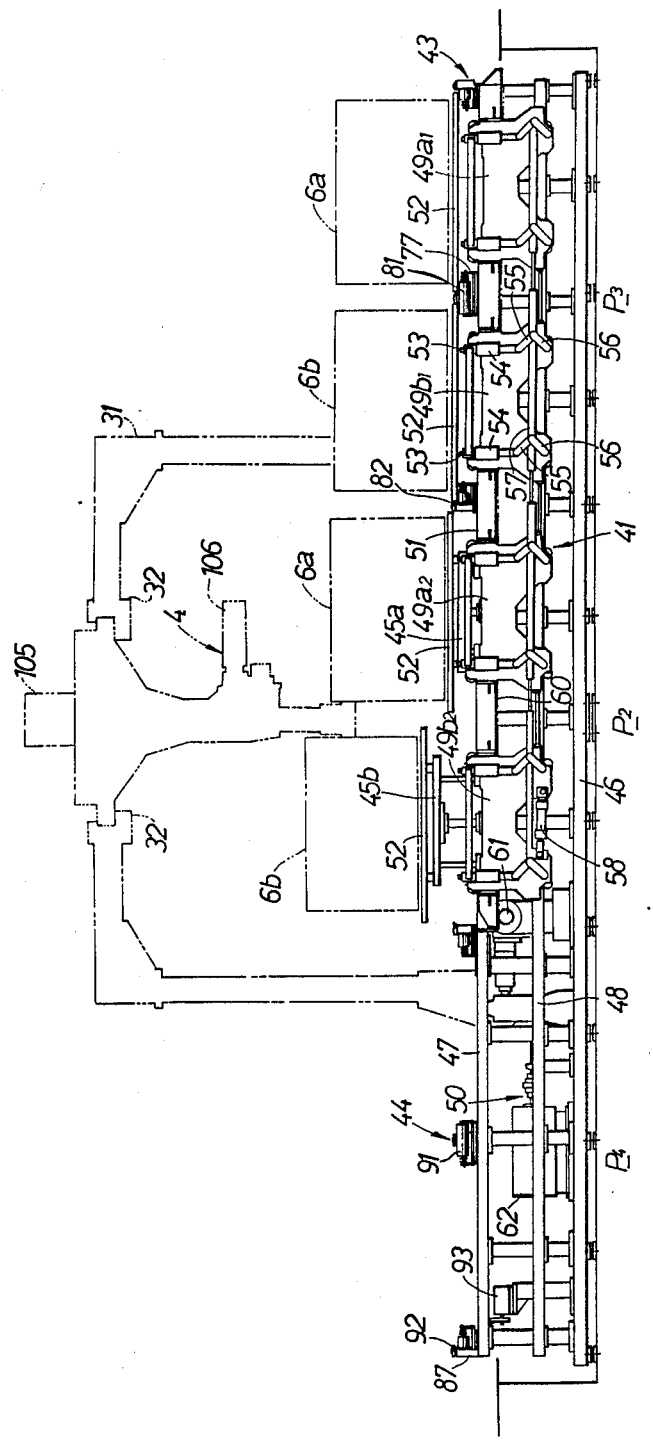
Figure 6:
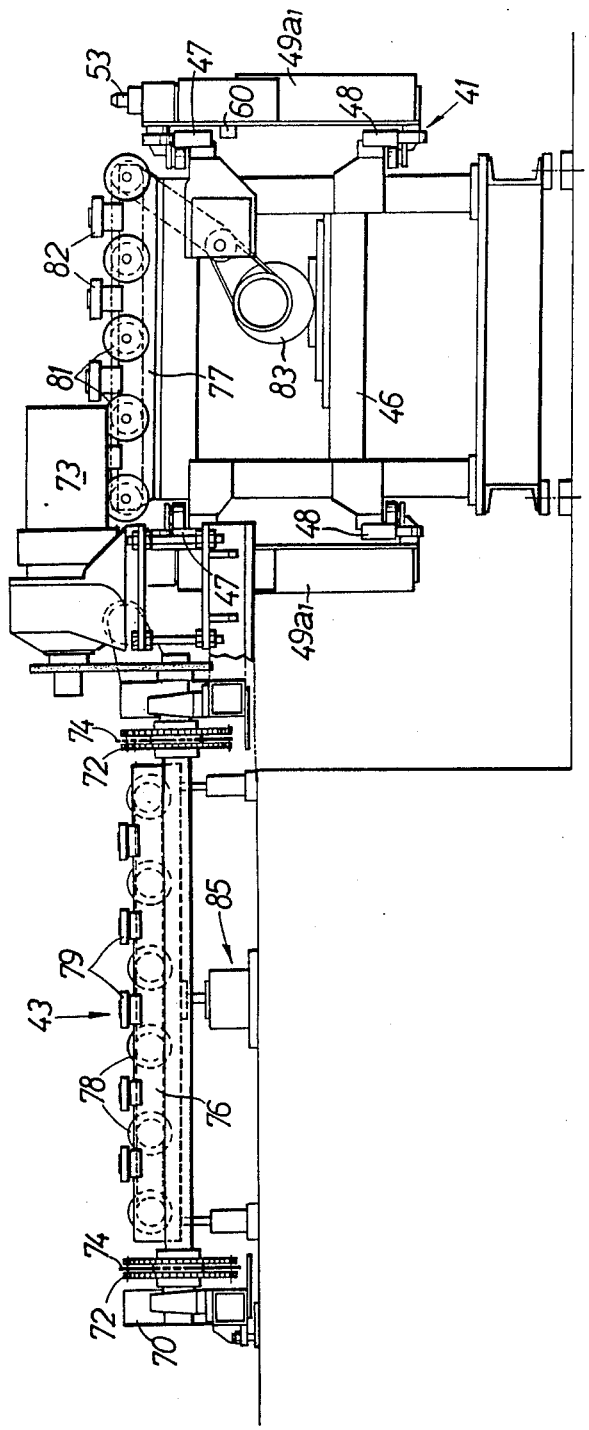
Figure 7:
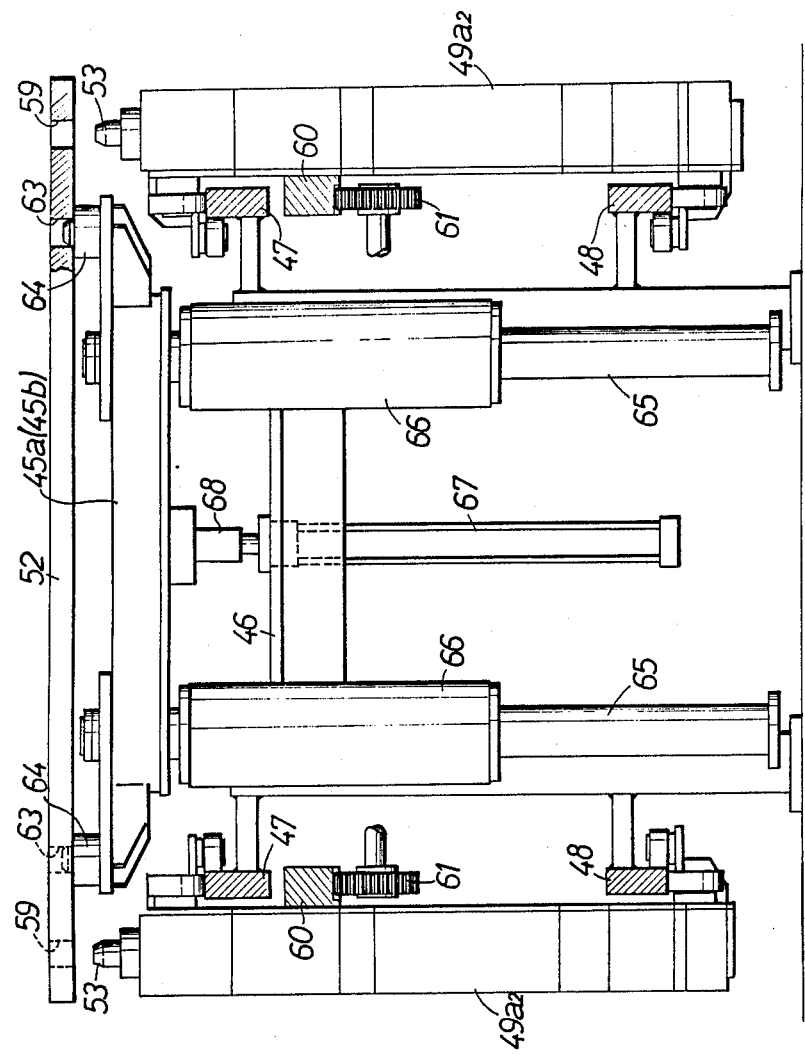

Referring also to FIG. 3, the loading transfer means S is disposed to extend between the ejection position $P_1$ and the loading position $P_2$ and is comprised of a transfer pallet $15a$ on which the press-formed parts $2a$ may be placed, and a transfer pallet $15b$ on which the press-formed parts $2b$ may be placed, the transfer pallets $15a$ and $15b$ being disposed on a rectangular frame 19 supported on a floor surface through support leg 20 at a variable distance for reciprocal movement between the ejection position $P_1$ and the loading position $P_2$.

A travel carriage 17 is placed on the frame 19 and has wheels 16 rollable on opposite sides of the frame 19, and the pair of transfer pallets $15a$ and $15b$ are disposed on the travel carriage 17 at a variable distance. A pair of drive sprockets 2 are carried on opposite sides at one end of the frame 19 in the transferring direction 18, while a pair of follower or driven sprockets 22 are carried on opposite sides at the other end of the frame 19 in the transferring direction 18. A drive shaft 25, which is connected to an output shaft of a reversible motor 24 fixedly placed on a support plate 23 under the frame 19, is connected to the drive sprockets 21. An endless chain 26 is passed around each of the drive sprockets 21 and each of the follower sprockets 22, these chains 26 and 26 being connected to the travel carriage 7. Thus, the operation of the motor 24 enables the travel carriage 17 to reciprocally move between the ejection position $P_1$ and the loading position $P_2$. Moreover, a pair of stoppers 27 and 27 are fixedly mounted at each of the ends of the frame 1 respectively closer to the ejection position $P_1$ and to the loading position $P_2$ and are abuttable against the transfer pallets $15a$ and $15b$, respectively.

Two sets of pairs of guide rods $28a$, $28a$; $28b$, $28b$ are fixedly mounted on the travel carriage 17 to extend from the opposite sides thereof toward the widthwise center, and the transfer pallets $15a$ and $15b$ are movable along the guide rods $28a$, $28a$; $28b$, $28b$. Cylinders 29 are supported and fixed under the travel carriage 17 at places corresponding to the transfer pallets, respectively. These cylinders 29 are fixedly disposed under the travel carriage 17 at the opposite sides thereof in parallel to the guide rods $28a$, $28a$; $28b$, $28b$, and have piston rods 30 connected to the corresponding transfer pallets $15a$ and $15b$, respectively. Thus, the expansion and contraction of the cylinders 29 cause the spacing between the transfer pallet 15a and 15b to be increased and decreased.

A support frame 31 is fixedly disposed at the loading position P$_2$, and the loading means 4 is disposed on the support frame 31. Specifically, the loading means 4 comprise a pair of guide rails 32 fixedly mounted on upper portions of the support frame 31 to lie above the loading transfer means 3 in parallel to the transferring direction 18, a base 33 carried on the guide rails 32 for reciprocal movement, a horizontal moving shaft 37 disposed at a lower end of a support arm 34 depending from the base 33 to have an axis perpendicular to the transferring direction 18, a pivotal arm 35 pivotally supported at its base end on the horizontal moving shaft 37, a pivotal shaft 38 pivotally supported at a leading end of the pivotal arm 35 to have an axis parallel to the horizontal moving shaft 37, fingers 36a and 36b mounted respectively at axially opposite ends of the pivotal shaft 38, and a plurality of suckers 39 mounted on each of the fingers 36a and 36b to releaseably hold each of the press-formed parts 2a and 2b.

A travelling reversible motor 105 for travelling along the guide rails 32 is placed on the base 33; and a motor 106 is placed on the support arm 34 for driving the pivotal arm 35 for pivotal movement and further, a motor 107 is mounted at the base end of the pivotal arm 35 for driving the pivotal shaft 38 for rotation. Each of the motors 105, 106 and 107 is operated according to a predetermined program.

Such loading means 4 can be used to simultaneously grasp the press formed parts 2a and 2b transferred in parallel and simultaneously to the loading position P$_2$ and to load them onto the carrier pallets 6a and 6b laying on the transporting means 5 while changing the attitudes thereof.

Referring to FIGS. 4, 5, 6 and 7, the transporting means 5 comprises a first transporting conveyer 41 capable of transporting the carrier pallets 6a and 6b on one straight line extending horizontally and perpendicularly to the transferring direction with its lengthwise center provided by the loading position P$_2$, a second transporting conveyer 42 disposed in parallel to the first transporting conveyer 41 on the opposite side from the continuously pressing machine I with respect to the first transporting conveyer 41, first and second transfer conveyers 43 and 44 for receiving and delivering the carrier pallets 6a and 6b between the first and second transporting conveyers 41 and 42, and a pair of supports 45a and 45b disposed at the lengthwise center of the first transporting conveyer 41 corresponding to the loading position P$_2$.

The first transporting conveyer 41 is disposed on one straight line extending perpendicularly to the transferring direction through the loading position P$_2$ and between a receiving position P$_3$ and a delivering position P$_4$ with a central location provided by the loading position P$_2$ and is capable of transporting the pair of carrier pallets 6a and 6b permitting separate placement of the press-formed parts 2a and 2b thereon, between the receiving position P$_3$ and the loading position P$_2$ as well as between the loading position P$_2$ and the delivering position P$_4$.

The first transporting conveyer 41 comprises a rest 46 fixedly mounted on the floor surface to extend between the receiving position P$_3$ and the delivering position P$_4$, rails 47 and 47 fixedly mounted in parallel on opposite sides of and above the rest 46, rails 48 and 48 fixedly mounted in parallel on opposite sides of and below the rest 46, four sets of moving stands 49a$_1$, 49a$_1$; 49b$_1$, 49b$_1$; 49a$_2$, 49a$_2$; and 49b$_2$, 49b$_2$ each forming a pair on opposite sides of the rest 46 and movable along he rails 47, 48; 47, 48, and drive means $0 for reciprocally driving the moving stands 49a$_1$, 49a$_1$ to 49b$_2$, 49b$_2$ along the rials 47. 48: 47. 48.

The moving stands 49a$_1$, 49a$_1$; 49b$_1$, 49b$_1$; 49a$_2$, 49a$_2$; and 49b$_2$, 49b$_2$ disposed on the opposite sides of the rest 46 are connected to one another by connecting members 51 and hence, can be moved together. Moreover, the moving stands 49a$_1$, 49b$_1$, 49a$_2$ and 49b$_2$ are disposed so that when they have been moved to the loading position P$_2$, the moving stands 49a and 49a$_2$ each assume a position corresponding to the press-formed part 2a located in the loading position P$_2$, while the moving stands 49b$_1$ and 49b each assume a position corresponding to the press-formed part 2b located in the loading position P$_2$.

A pallet-bearing plate 52 capable of being loaded with the carrier pallet 6a, 6b is placed on each of the moving stands 49a$_1$, 49a$_1$; 49b$_1$, 49b$_1$; 49a$_2$, 49a$_2$; and 49b$_2$, 49b$_2$ forming a pair on the opposite sides of the rest 46. The pallet-bearing plate 52 is provided with a support hole 59 at a point corresponding to each of corners of a phantom tetragone thereof, and a pair of support pins 53 and 53 are vertically movably disposed on each of the moving stands 49a$_1$, 49a$_1$; 49b$_1$, 49b$_1$; 49a$_2$, 49a$_2$; and 49b$_2$, 49b$_2$ and adapted to be fitted into the support hole 59 in the pallet-bearing plate 52 from below to support the plate 52. The support pins 53 are slidably received respectively in guide tubes 54 and 54 mounted on each of the moving stands 49a$_1$, 49a$_1$; 49b$_1$, 49b$_1$; 49a$_2$, 49a$_2$; and 49b$_2$, 49b$_2$. Moreover, each of the support pins 53 is connected at its lower end to one end of each of first links 55. The other end of the first link 55 is connected to one end of each of second links 56 and 56 each of which is pivoted at the other end thereof on each of the moving stands 49a$_1$, 49a$_1$; 49b$_1$, 49b$_1$; 49a$_2$, 49a$_2$; and 49b$_2$, 49b$_2$ at a location below the support pin 53 on an extension of an axis of the support pin 53. A third link 57 extending lengthwise of the rails 47 and 48 is connected to a connection of the first link with the second link 56. The respective third links 57 of the moving stands 49a$_1$, 49a$_1$; 49b$_1$, 49b$_1$; 49a$_2$, 49a$_2$; and 49b$_2$, 49b$_2$ are coaxially connected together. A first lifting cylinder 58 disposed on the movIng stand 49b$_2$, 49b$_2$ and connected to the third link 57, so that the support pins 53 of the moving stands 49a$_1$, 49a$_1$; 49b$_1$, 49b$_1$; 49a$_2$, 49a$_2$; and 49b$_2$, 49b$_2$ are synchronously raised and lowered in response to expansion and contraction of the first lifting cylinder 58.

The drive means 50 comprises a rack 60 fixed mounted on each of the moving stands 49a$_1$, 49b$_1$, 49a$_2$ and 49b$_2$ disposed on one side of the rest 46, a rack 60 fixedly mounted on each of the moving stands 49a$_1$, 49b$_1$, 49a$_2$ and 49b$_2$ disposed on the other side of the rest 46, pinions 61 and 61 meshed with the racks 60 and 60 respectively, and a reversible drive motor 62 connected to the pinions 61 and 61. The drive motor 62 is fixedly disposed on the rest 46 at a location corresponding to the delivering position P$_4$.

The drive means 50 permits the moving stands 49a$_1$, 49a$_1$, 49b$_1$ and 49b$_1$ to be reciprocally driven between the receiving position P$_3$ and the loading position P$_2$, and permits the moving stands 49a$_2$, 49a$_2$, 49b$_2$ and 49b$_2$ to be reciprocally driven between the loading position P$_2$ and the delivering position P$_4$.

The support 45a is liftably disposed on the rest 46 to correpond to the press-formed part 2a in the loading position $P_2$, and the support 45b is liftably disposed on the rest 46 to correspond to the press-formed part 2b in a location adjacent the support 45a. Each of the supports 45a and 45b is provided with four support pins 64 which are adapted to be fitted into support holes 63 made at corners of a phantom tetragone in the pallet bearing plate 52 from below to support the pallet-bearing plate 52. Four vertically extending guide rods 65 are connected at their upper ends to each of the supports 45a and 45b and slidably received in four guide tubes 66 fixedly mounted on the rest 46, respectively. A second lifting cylinder 67 having a vertically extending axis is fixed to the rest 46 at a place corresponding to the central portion of each of the supports 45a and 48b, and has a piston rod 68 connected at its upper end to the corresponding one of the supports 45a and 45b. Thus, in response to expansion and contraction of the second lifting cylinder 67, each of the supports 45a and 45b is lifted and lowered while being guided in the guide tubes 66. The vertically relative positions of the supports 45a and 45b can be adjusted by setting the amounts of second lifting cylinder expanded and contracted at different values.

The second transporting conveyer 4 is disposed adjacent the first transporting conveyer 41 on the opposite side from the continuously pressing machine 1 to extend between a lead-on position $P_6$ corresponding to the receiving position $P_3$ and a take-out position $P_5$ corresponding to the receiving position $P_4$, and comprises a rest 70 fixedly mounted on the floor surface to extend between the take-out position $P_5$ and the lead-on position $P_6$, a pair of left and right follower sprockets 71 and 71 pinned to the rest 70 at an end closer to the take out position $P_5$, a pair of drive sprockets 72 and 72 pinned to the rest 70 at an end closer to the lead-on position $P_6$, a drive motor 73 fixedly disposed on the rest 70 and connected to the drive sprockets 72 and 72, and a pair of left and right endless chains 74 and 74 extending around the drive sprockets 72 and the follower sprockets 7. The pallet-bearing plate 52 can be placed onto the chains 74, and the second transporting conveyer 42 is capable of transporting the pallet-bearing plate 52 from the take out position $P_5$ to the lead-on position $P_6$.

At the middle between the take-out position $P_5$ and the lead-on position $P_6$, a plurality of guide rollers 75 for guiding one side of the Pallet-bearing plate 52 are pinned to an upper end of a side of the rest 70 closer to the first transporting conveyer 41, while a plurality of guide rollers 75 for guiding the other side of the pallet-bearing plate 52 between he take-out position $P_5$ and the lead-on position $P_6$ are pinned to the upper end of the opposite side of the rest 70 from the first transporting conveyer 41.

The first transfer conveyer 43 is a conveyer for simultaneously transferring a pair of pallet-bearing plates 52 arranged in parallel from the lead-on position $P_6$ to the receiving position $P_3$ and comprises a liftable frame 76 disposed on a side closer to the second transporting conveyer 42, and a stationary frame ? 7 fixedly mounted on the rest 46 of the first transporting conveyer 41. The first transfer conveyer 43 further includes a plurality of transfer rollers 78 pinned in three rows to the liftable frame 76 to simultaneously carry the pair of pallet-bearing plates 52 arranged in parallel, guide rollers 79 pinned in three rows to the liftable frame 76 to guide the opposite sides of such pair of pallet-bearing plates 52, a motor 80 disposed on the liftable frame 76 to rotatively drive the transfer rollers 78, a plurality of transfer rollers 81 pinned in three rows to the stationary frame 77 to simultaneously carry a pair of pallet-bearing plates 52 arranged in parallel, guide rollers 82 pinned in three rows to the stationary frame 77 to guide opposite sides of the pair of pallet-bearing plates 52, a motor 83 disposed on the stationary frame 77 to rotatively drive the transfer rollers 81, and free rollers 84 disposed in correspondence to the transfer rollers 78 and 81 between the liftable frame 76 and the stationary frame 77.

The stationary frame 77 is fixed on the rest 46 of the first transporting conveyer 41 in such a manner that the pallet-bearing plate 52 riding on the transfer rollers 81 pinned on the stationary frame 77 may be located above the upper ends of the support pins 53 mounted on the moving stands $49a_1$, $49a_1$, $49b_1$ and $49b_1$ when in their lowermost limit positions. The free rollers 84 are disposed in stationary locations at the same level as the transfer rollers 81. The liftable frame 76 is capable of being lifted and lowered by lift-driving means 85 such as a cylinder provided between the floor surface, and when the liftable frame 76 is in its lowermost limit position, the transfer rollers 78 s are located below the pallet-bearing plate 52 lying on the chains 74 and 74 of the second conveyer 42.

Such first transfer conveyer 43 enables a pair of pallet-bearing plates 52 arranged in parallel to be transferred from the lead-on position $P_6$ of the second transporting conveyer 42 to the receiving position $P_3$ of the first transporting conveyer 4 by operating the motors 80 and 83 in a condition that the liftable frame 76 has been raised to bring the transfer rollers 78 to the same level as the transfer rollers 81.

The second transfer conveyer 44 is a conveyer for simultaneously transferring a pair of pallet-bearing plates arranged in parallel from the delivering position $P_4$ to the take-out position $P_5$, and comprises a liftable frame 86 disposed on a side closer to the second transporting conveyer 42, a stationary frame 87 fixedly mounted on the rest 46 of the first transporting conveyer 41, a plurality of transfer rollers 88 pinned in three rows to the liftable frame 86 to simultaneously carry the pair of pallet-bearing plates arranged in parallel, guide rollers 89 pinned in three rows to the liftable frame 86 to guide the opposite sides of such pair of pallet-bearing plates 52, a motor 90 disposed on the liftable frame 86 to rotatively drive the transfer rollers 88, a pluralitY of transfer rollers 91 pinned in three rows to the stationary frame 87 to simultaneously carry a pair of pallet-bearing plates 52 arranged in parallel, guide rollers 92 pinned in three rows to the stationary frame 87 to guide opposite sides of the pair of pallet-bearing plates 52, a motor 93 disposed on the stationary frame 87 to rotatively drive the transfer rollers 81, and free rollers 94 disposed in correspondence to he transfer rollers 88 and 91 between the liftable frame 86 and the stationarY frame 87.

The stationary frame 87 is fixed on the rest 46 of the first transporting conveyer 41 in such a manner that the pallet-bearing plate 52 riding on the transfer rollers 81 pinned on the stationary frame 87 may be located above the upper ends of the support pins 53 mounted on the moving stands $49a_1$, $49a_1$, $49b_1$ and $49b_1$ when in their lowermost limit positions. The free rollers 94 are disposed in stationary locations at the same level as the transfer rollers 91. The liftable frame 86 is capable of being lifted and lowered bY lift driving means (not shown) such as a cylinder provided between the floor surface, and when the liftable frame 86 is in its lowermost limit position the transfer rollers 88 are located below the chains 74 and 74 of the second transporting conveyer 42.

Such second transfer conveyer 44 enables a pair of pallet-bearing plates 52 arranged in parallel to be transferred from the delivering position $P_4$ of the first transporting conveyer 41 to the take-out position $P_5$ of the second transporting conveyer 42 by operating the motors 90 and 93 in a condition that the liftable frame 86 has been raised to bring the transfer rollers 88 to the same level as the transfer rollers 91.

Figure 8:
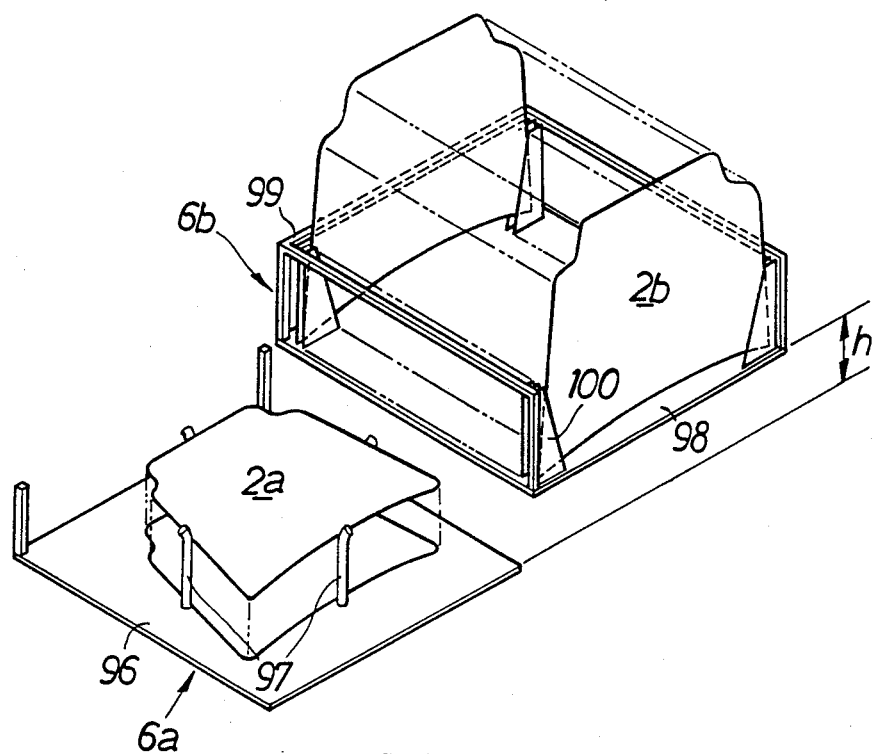

Referring to FIG. 8, the carrier pallet 6a is formed so that the press-formed parts 2a such as stiffeners may be placed thereon in a stack, and it includes a plurality of restricting bars 97 raised on a carrier plate 96 placeable onto the pallet-bearing plate 52 for restricting the peripheral edge of the press-formed part 2a. On the other hand, the carrier pallet 6b is formed so that the press-formed parts 2b such as automobile hood outer members may be placed thereon in a laterally separated relation to assume vertical attitudes. It comprises a carrier plate 98 placeable onto the pallet-bearing plate 52 a substantially U-shaped frame 99 mounted on the carrier plate 98 to restrict side edges of the press formed parts 2b, and a plurality of separater plates 100 fixedly mounted on the frame 99 to separate the press formed parts 2b from one another.

The one carrier pallet 6a can be loaded with press-formed parts 2a of a number larger by a multiple than the number of press-formed parts 2b loaded on the other carrier pallet 6b, because the press formed parts 2a are loaded in a stack. For example, 100 press-formed parts 2a can be loaded on the carrier pallet 6a, whereas 50 press-formed parts 2b can be loaded on the other carrier pallet 6b.

The operation of the first embodiment will be described below. A pair of press-formed parts 2a and 2b made through press-forming in the continuously pressing machine 1 are simultaneously ejected in parallel by the transfer means 11. During this time, the transfer pallet 15a and 15b of the loading transfer means 3 are on standby in the ejection position $P_7$ at a center-to-center spacing corresponding to a distance 11 (see FIG. 2) between the centers of the press-formed parts 2a and 2b in the ejection position $P_1$, and the press-formed parts 2a and 2b are placed onto the carrier pallets 15a and 15b, respectively.

The carrier pallets 15a and 15b with the press-formed parts 2a and 2b placed thereon are moved from the ejection position $P_1$ to the loading position $P_2$ by travelling of the travel carriage 17, but increased in spacing therebetween by operating the cylinders 29 in the course of such transfer. Thus, when the transfer pallets 15a and 15b have reached the loading position $P_2$, the spacing therebetween corresponds to the distance 12 (see FIG. 2) between the centers of the supports 45a and 45b in the transporting means 5.

The construction such that the press-formed parts 2a and 2b can be transferred between the ejection position $P_1$ and the loading position $P_2$ while varying the spacing between the transfer pallets 15a and 15b in correspondence to the spacing between the press formed parts 2a and 2b in the ejection position $P_1$ and the spacing between the supports 45a and 45b in the loading position $P_2$ in the above manner contributes to a simplification of the structure and operation of the loading means 4 in the loading position $P_2$.

On the other hand, in the first transporting conveyer 41, the moving stands $49a_1$, $49a_1$, $49b_1$ and $49b_1$ are in the receiving position $P_3$. Moreover, the pallet-bearing plate 52 has been placed on each of the moving stands $49a_1$, $49a_1$, $49b_1$ and $49b_1$ which are in the receiving position $P_3$, and the carrier pallets 6a and 6b have been placed on the pallet-bearing plates 52 on these moving stands $49a_1$, $49a_1$, $49b_1$ and $49b_1$. At this time, the moving stands $49a_2$, $49a_2$, $49b_2$ and $49b_2$ are in the loading position $P_2$, but the pallet-bearing plates 52 lying on the moving stands $49a_2$, $49a49b_2$ and $49b_2$ have been transferred onto the supports 45a and 45b, respectively, and the carrier pallets 6a and 6b have been placed onto the pallet-bearing plates 52, by raising of the supports 45a and 45b. Furthermore, due to the different amounts that supports 45a and 45b are raised, the carrier pallets 6a and 6b are on stand by in the loading position $P_2$ in such a condition that the carrier pallet 6b lies at a level higher by a height h than that of the carrier pallet 6a as shown in FIG. 8.

Figure 9:
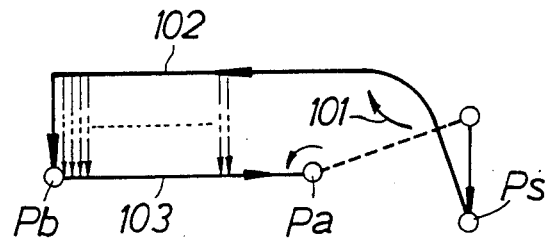

The loading means 4 is operated in such a condition, causing the press-formed parts 2a and 2b to be loaded onto the carrier pallets 6a and 6b while describing a path as shown in FIG. 9. Specifically, the suckers 39 are lowered, so that the press formed parts 2a and 2b laying on the transfer pallets 15a and 15b ar sucked and held at a sucking point ps by the suckers 39 and lifted up from the transfer pallets 15a and 15b.

Then, the press-formed parts 2a and 2b are moved toward the carrier pallets 6a and 6b while being varied in attitude or position from horizontal attitudes or positions to vertical attitudes or positions, as shown by an arrow 101, in accordance ih rotation of the fingers 36a and 36b. When the press-formed parts 2a and 2b have been horizontally moved to a predetermined location in the vertical attitudes as shown by an arrow 102, the fingers 36a and 36b are lowered, and at a first releasing point Pb, the one type of press-formed parts 2b are released from the suckers 39. The fingers 36a and 36b are further moved as shown by an arrow 103 in a direction reverse to the arrow 102 and are rotated at a second releasing point pa, whereby the press-formed parts 2a are changed in attitude to the horizontal attitudes and then released from the suckers 39.

In this manner, the press-formed parts 2a are stacked on the one carrier pallet 6a in the horizontal attitudes, while the press-formed parts 2b in the vertical attitudes are loaded on the other carrier pallet 6b with the separater plates interposed between the adjacent twos. Moreover, since the carrier pallet 6a loaded with the press-formed parts 2a stacked one on another lies at a level lower than that of the other carrier pallet 6b loaded with the press-formed parts 2b in the vertical attitudes, the press-formed parts 2a already placed on the carrier pallet 6a cannot interfere with the press formed parts 2a which are to be newly loaded, even if the fingers 36a and 36b of the loading means 4 are designed to perform the same operation. This makes it possible to simplify the operation of the loading means 4.

When the amount of press-formed parts 2b loaded on the carrier pallet 6b has reached a predetermined number, e.g., 50, loading of the press-formed parts 2a and 2b onto the corresponding carrier pallets 6a and 6b in the loading position $P_2$ is completed even if the amount of press-formed parts 2a onto the carrier pallet 6a is one half of a predetermined number. Thus, when a predetermined amount of the press formed parts $2b$ have been loaded onto the carrier pallet $6b$. the supports $45a$ and $45b$ are lowered to the lowermost limit positions. This causes the pallet-bearing plates 52 having the carrier pallets $6a$ and $6b$ respectively placed thereon to be transferred from the supports $45a$ and $45b$ onto the moving stands $49a_2$, $49a_2$; $49b_2$ and $49b_2$ of the first transporting conveyer 41 in the loading position $P_2$.

Thereupon, the movement of the first transporting conveyer 41 is started, and the moving stands $49a_2$, $49a_2$; $49b_2$ and $49b_2$ are moved from the loading position $P_2$ to the delivering position $P_4$, while the moving stands $49a_1$, $49a_1$, $49b_1$ and $49b_1$ are moved from the receiving position $P_3$ to the loading position $P_2$. This results in that the carrier pallet $6a$ loaded with the press-formed parts $2a$ of a predetermined number or one half thereof and the carrier pallet $6b$ loaded with press-formed parts $2b$ of a predetermined number have been moved to the delivering position $P_4$, while the carrier pallet $6a$ loaded with the press formed parts $2a$ of one half of a predetermined number or the empty carrier pallet $6a$ and the empty carrier pallet $6b$ have been moved to the loading position $P_2$. Then, in the delivering position $P_4$, the support pins 53 of the moving stands $49a_2$, $49a_2$, $49b_2$ and $49b_2$ are lowered, and the carrier pallets $6a$ and $6b$ are placed onto the transfer rollers 91 of the second transporting conveyer 44. In the loading position $P_2$, the supports $45a$ and $45b$ are raised, and the pallet-bearing plates 52 having the carrier pallets $6a$ and $6b$ placed thereon are put onto the supports $45a$ and $45b$, respectively. Thereafter, in the first transporting conveyer 41, the moving stands $49a_2$, $49a_2$, $49b_2$ and $49b_2$ are returned to the loading position $P_2$, while the moving strands $49a_1$, $49a_1$, $49b_1$ and $49b_1$ are returned to the receiving position $P_3$. Such operation of the first transporting conveyer 41 and such raising of the supports $45a$ and $45b$ are conducted for a period of time until new press-formed parts $2a$ and $2b$ have been transported to the loading position $P_2$.

The pallet-bearing plate 52 placed on the transfer rollers 91 of the first transfer conveyer 41 is transferred from the delivering position $P_4$ to the take-out position $P_5$ by rotatively driving the transfer rollers 88 and 91 after the liftable frame 86 is brought to the same level as the transfer rollers 91. Then, the carrier pallet $6b$ loaded with a predetermined amount of the press-formed parts $2b$ is taken out in the take-out position $P_5$. When the carrier pallet $6a$ loaded with a predetermined amount of the press-formed parts $2a$ have been transported to the take out position $P_5$, it is taken out in the the take-out position $P_5$, or when the carrier pallet $6a$ loaded with one half of a predetermined amount of the press-formed parts $2a$ have been transported to the take out position $P_5$, taking out of the carrier pallet $6a$ is not carried out.

The pallet-bearing plate 52 with the carrier pallet $6b$ taken out therefrom in the take-out position $P_5$ and the pallet-bearing plate 52 either with the carrier pallet $6a$ taken out therefrom or with the carrIer pallet $6a$ loaded with a one half of predetermined amount of the press-formed parts $2a$ being left thereon are put onto the chains 74 and 74 of the second transfer conveyer 44 by lowering the liftable frame 86, and are then transported to the lead-on position $P_6$ by the second transporting conveyer 42.

In the lead-on position $P_6$, the empty carrier pallet $6b$ is newly placed onto the pallet-bearing plate 52 with the carrier pallet $6b$ taken out therefrom in the take-out position $P_5$. When the carrier Pallet $6a$ is being taken out in the take-out position $P_5$, the empty carrier pallet $6a$ is newly placed onto the pallet bearing plate 52. When the pallet-bearing plate 52 with the carrier pallet thereon, loaded with one half of a predetermined amount of the press-formed parts $2a$ has been transported to the lead-on position $P_6$, supplying of a new carrier pallet $6a$ onto the pallet-bearing plate 52 is not conducted.

When the moving stands $49a_1$, $49a_1$; $49b_1$ and $49b_1$ of the first transporting conveyer 41 have been returned to the delivering position $P_3$, the carrier pallets $6a$ and $6b$ which are in the lead on position $P_6$ are transferred to the receiving position $P_3$ by driving the transfer rollers 78 and 81 in a condition that the liftable frame 76 has been raised to put the pallet bearing plate 52 onto the transfer rollers 78 and to bring the transfer rollers 78 and 81 to the same level, and they are then placed onto the moving stands $49a_1$, $49a_1$; $49b_1$ and $49b_1$ by raising the support pins 53 of the moving stands $49a_1$, $49a_1$; $49b_1$ and $49b_1$.

In this manner, a pair of pallet-bearing plates 52 are circulated in movement from the loading position $P_2$ via the delivering position $P_4$, the take-out position $P_5$, the lead-on position $P_6$ and the receiving position $P_3$ back to the loading position $P_2$. The carrier pallet $6b$ loaded with a predetermined amount of the press-formed parts $2b$ in the loading position $P_2$ is taken out in the take-out position P5 , and a new carrier pallet $6b$ is supplied onto the pallet-bearing plate 52 in the lead-on position $P_6$. On the other hand, the carrier pallet $6a$ loaded with one half of a predetermined amount of the press-formed parts $2a$ in the loading position $P_2$ is circulated without being taken out until it has been loaded with such Predetermined amount of the press formed parts $2a$ . Accordingly, it is possible to accommodate the difference in number of press formed parts $2a$ and $2b$ loaded without increasing of the number of the carrier pallets $6a$ and $6b$. Moreover, the replacement of the carrier pallets $6a$ and $6b$ can be carried out without interruption of the ejection of the press formed parts $2a$ and $2b$ to the ejection position $P_1$, leading to an avoidance of shut-down of the continuously pressing machine 1 to provide an improvement in efficiency.

Figure 10:
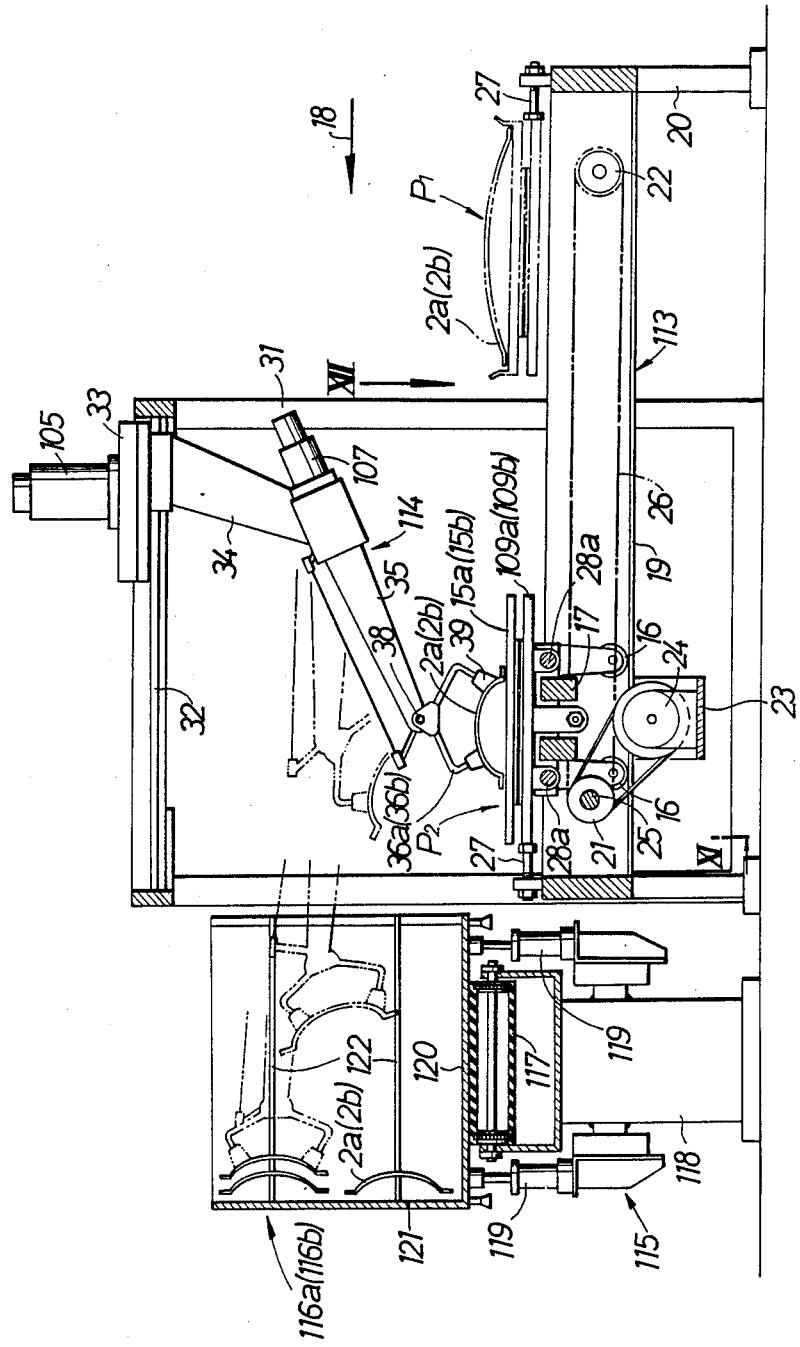
Figure 11:
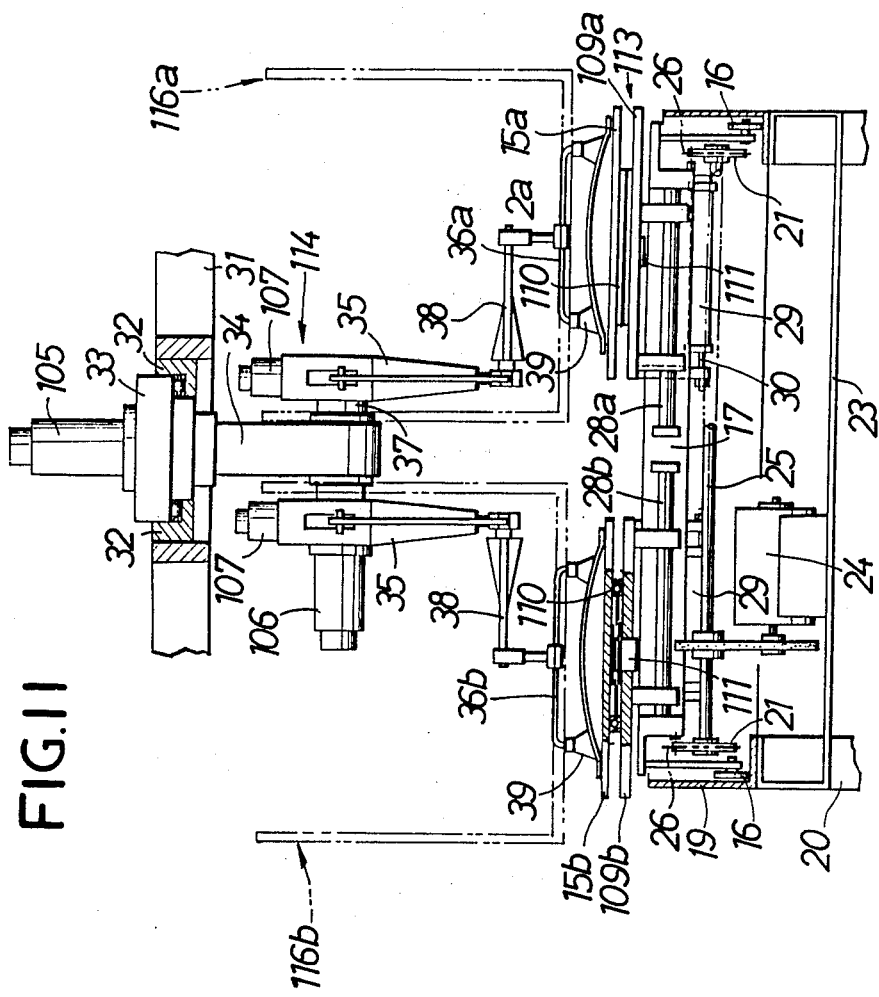
Figure 12:
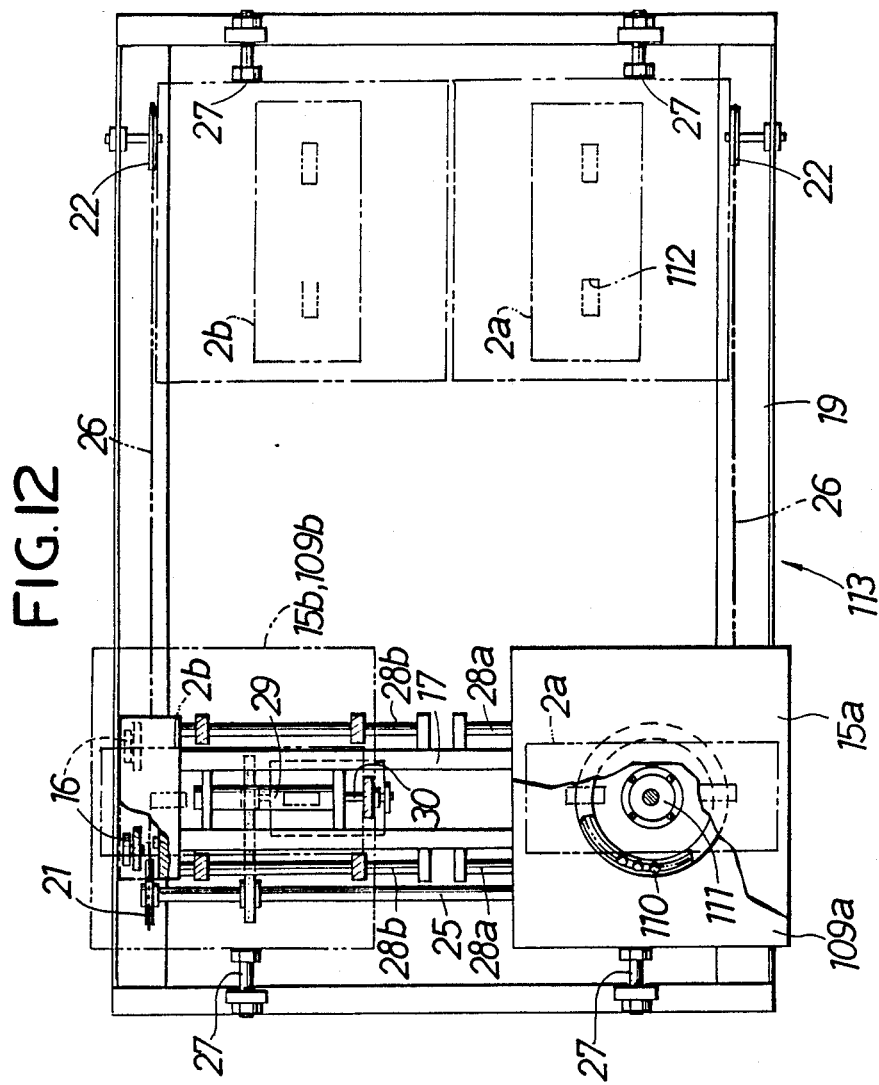

FIGS. 10 to 12 illustrate a second embodiment of the present invention, herein portions corresponding to those in the above-described first embodiment are designated by the same reference characters.

In loading transfer means 113, moving stands $109a$ and $109b$ are movably carried on two sets of pairs of guide rods $28a$, $28a$; $28b$, $28b$ fixed to the travel carriage 17. In addition, piston rods 30 of cylinders 29 and 29 disposed below the travel carriage 17 are connected to the corresponding moving stands $109a$ and $109b$, respectively. Thus, synchronous expansion and contraction of the cylinders 29 and 29 enable the spacing between the moving stands $109a$ and $109b$ to be increased and decreased.

Transfer pallets $15a$ and $15b$, on which press-formed parts $2a$ and $2b$ are separately placed, are supported on the moving stands $109a$ and $109b$ for rotation about a vertical axis. More specifically the transfer pallets $15a$ and $15b$ rotatably supported on the moving stands $109a$ and $109b$ through circular thrust bearings 110, respectively, and an output shaft of a rotating motor 111; disposed under each of the moving stands $109a$ and $109b$ to have a vertical axis is connected to a central portion of each of the transfer pallets $15a$ and $15b$. Thus, the transfer pallets 15a and 15b are movable toward and away from each other, and rotatable about the vertical axes, respectively.

In loading means 14 disposed in the loading position $P_2$, a pair of pivotal arms 35 and 35 are swingably beared on a horizontal moving shaft 37 at a lower end of the support arm 34 at axially spaced apart places with the support arm 34 interposed therebetween. The moving shaft 37 extends on opposite sides of the support arm 34 to have an axis perpendicular to the transferring direction 18. Fingers 36a and 36b each having a plurality of suckers 39 are detachably mounted on pivotal shafts 38 and 38 pivotally supported at leading ends of the pivotal arms 35 and 35, respectively.

Transporting out means 115 comprises a transporting conveyer 117, and plural sets of pairs of carrier pallets 116a and 116b put on the transporting conveyer 117. The transporting conveyer 17 is supported on a rest 18 fixedly mounted on a floor surface and can be intermittently operated to sequentially carry a pair of carrier pallets 116a and 16b to the loading position $P_2$ with a spacing therebetween being maintained constant. Stoppers (not shown) are disposed on opposite sides of the transporting conveyer 117 respectively and are each changable over between a state in which it is engaged with the carrier pallet 116a, 116b and a state in which it is disengaged from the carrier pallet 116a, 116b in order to position the pair of carrier pallets 116a and 116b in a location corresponding to the loading position $P_2$. Cylinders 119 are supported and fixed on the rest 118 for lifting the carrier pallets 116a and 116b from the transporting conveyer 117 to fix them in a condition in which they have been positioned in the loading position $P_2$.

When the carrier pallets 116a and 116b have been brought into standby states in locations corresponding to the loading position $P_2$ by the stoppers and the cylinders 119, the distance between the centers of the carrier pallets 116a and 116b is larger than that between the centers of the press-formed parts 2a and 2b which has been simultaneously ejected to the ejection position $P_1$ and arranged in parallel.

The carrier pallets 116a and 116b have the same construction and each comprise a bottom plate 120, a side plate 121 rised on the bottom plate 120 and formed into a substantially U-shape with a top and a side closer to the loading transfer means 113 being opened, and support bars 122, 122,—mounted in pairs at two vertically spaced apart points to extend from the side plate 121 toward the loading transfer means 113. The press-formed parts 2a and 2b each have a through hole 112 and are loaded onto the carrier pallets 116a and 116b in upright attitudes and in vertically two states, with the support bar 122 inserted through the through holes 112 in the press-formed parts 2a, 2b in each stage.

The spacing between the pivotal arms 35 and 35 in the loading means 14 is determined such that the side plates 121 of the carrier pallets 116a and 16b are not obstacles in a condition of the carrier pallets 116a and 116b located in the loading position $P_2$.

The operation of the second embodiment will be described below. A pair of press-formed parts 2a and 2b made through a press forming in the continuously pressing machine 1 are placed onto the transfer pallet 15a and 15b of the loading transfer means 113. The pressing machine 1 presses materials in attitudes as shown by chain lines in FIG. 12 into press formed parts 2a and 2b in order to reduce the width of the pressing machine, and the press-formed parts 2a and 2b are placed in such attitudes left intact onto the transfer pallets 15a and 15b.

On the other hand, in the transporting means 115, a pair of carrier pallets 116a and 116b have been positioned and fixed in parallel in the loading position $P_2$ despite travelling of the transporting means 117, through lifting of them by means of the cylinders 119, and the succeeding carrier pallets 116a and 116b will be positioned and fixed in the same manner.

The transfer Pallets 15a and 15b with the press-formed parts 2a and 2b respectively placed thereon are moved from the ejection position $P_1$ to the loading position $P_2$ as a result of travelling of the travel carriage 17, and in the course of such transfer, they are increased in spacing therebetween by operating the cylinders 29. When the transfer pallets 15a and 15b have reached the loading position $P_2$. the spacing therebetween corresponds to that between the carrier pallets 116a and 116b which are on standby in the loading position $P_2$. Moreover, since the press-formed parts 2a and 2b are loaded in vertically two states onto the carrier pallets 116a and 116b, the transfer pallets 15a and 15b are turned through 90 degree in the course of transfer and thus, in the loading position $P_2$, each of the press formed parts 2a and 2b assumes an attitude turned through 90 degree as shown by a chain line in FIG. 12.

When the pair of press-formed parts 2a and 2b have been brought to the loading position $P_2$ in this manner, the loading means 114 is operated, causing the press-formed parts 2a and 2b to be loaded onto the carrier pallets 116a and 116b which are on standby in the loading position $P_2$. During such loading, the side plates 121 of the carrier pallets 116a and 116b cannot be obstacles to the operation of the loading means 114, thereby ensuring that the press-formed parts can be efficiently loaded onto the carrier pallets 116a and 116b, because the pair of pivotal arms 35 and 35 corresponding to the carrier pallets 116a and 116b are provided on the loading means 114, and the plurality of suckers 39 are mounted on each of the pivotal arms 35 through the pivotal shaft 38 and the fingers 36a, 36b.

The construction such that the press formed parts 2a and 2b may be transferred between the ejection position $P_1$ and the loading position $P_2$ while varying the spacing between the transfer pallets 15a and 15b in correspondence to the spacing between the press-formed parts 2a and 2b in the ejection position P1 and the spacing between the carrier pallets 116a and 116b in the loading position $P_2$ in the above manner contributes to a simplification of the structure and operation of the loading means 114 in the loading position $P_2$. Additionally, since the transfer pallets 15a and 15b may be turned during transportation between the ejection position $P_1$ and the loading position $P_2$, it is unnecessary to change the attitudes of the press-formed parts 2a and 2b in transferring them by the loading means 114, and this insures an efficient and stable loading operation.

Although the two transfer pallets 15a and 15b have been designed to be both turned in the above embodiments, only one of the transfer pallets 15a and 15b may be turned in a case here two types of press-formed parts 2a and 2b are loaded in different attitudes onto the corresponding carrier pallets 116a and 116b.

FIGS. 13 to 19 illustrated a third embodiment of the present invention, wherein the same reference characters are used to designate portions corresponding to those in the previous first and second embodiments.

Small sized press formed parts 2a and 2b made to by two through simultaneous press forming in the continuously pressing machine 1 are simultaneously ejected in parallel to the ejection position $P_1$ and sequentially transferred from the ejection position $P_1$ to the loading position $P_2$ by loading transfer means 123. The small-sized press-formed parts 2a and 2b which have reached the loading position $P_2$ are loaded onto carrier pallets 126a and 126b which are on standby in parallel on first transporting means 115', by the loading means 114, and they are then transported out by the first transporting means 115'.

It should be noted that the lower dies $7a_n$, $7a_{n-1}$,—, $7b_n$, $7b_{n-1}$,—and the upper dies $8a_n$, $8a_{n-1}$, —, $8b_n$, $8b_{n-1}$,—(see FIGS. 1 and 2) in the continuously pressing machine 1 are replaceable, and the replacement of the dies makes it possible to produce a single large-sized press-formed part 2c in the continuously pressing machine 1 in place of the small-sized press-formed parts 2a and 2b. The large-sized-press formed part 2c is likewise ejected from the pressing machine 1 to the ejection position $P_1$ and transferred by the loading transfer means 123 from the ejection position $P_1$ to the loading position $P_2$ where it is loaded onto second transporting means 125 by the loading means 114.

The first and second transporting means 115' and 125 are mounted to extend in a direction perpendicular to the transferring direction 18 across the loading position $P_2$ established at a place in front of the continuously pressing machine 1 in the transferring direction 18.

In the loading transfer means 23, a turn member 127 is disposed for rotation about a vertical axis between transfer pallets 15a and 15b disposed for variation in spacing therebetween on the travel carriage 17 reciprocally movable between the ejection position $P_1$ and the loading positions $P_2$. Specifically, a rotating motor 128 having a vertical axis is fixedly supported on the travel carriage 17 at a place corresponding to between the transfer pallets 15a and 15b with he spacing therebetween being smallest. The turn member 127 is connected to an output shaft of the rotating motor 128. A plurality of e.g. four receiving members 129 are detachably mounted on the turn member 127 and extend to project upwardly of the transfer pallets 15a and 15b on opposite sides thereof. In transporting small-sized press-formed parts 2a and 2b, the receiving members 129 are detached, and only when large sized press-formed parts 2c are to be transported the receiving members 129 are attached to the turn member 127.

Either fingers 36a, 36b,—each having a plurality of, e.g., four suckers 39—to releaseably hold the small-sized press-formed parts 2a and 2b or fingers 36a', 36b'—each having a plurality of, e.g., four suckers 39—to releasably hold the large-sized press-formed parts 2c can be attached to the pivotal arms 35 and 35 in the loading means 114 in a changeable manner.

The first transporting means 115' comprises a transporting conveyer 117 supported on a rest 118 and plural sets of pairs of carrier pallets 126a and 126b placed onto the transporting conveyer 117. The carrier pallets 126a and 126b have the same construction and comprises a bottom plate 130, side plate 131 extending upwardly from the bottom plate 130 at one end thereof on an opposite side from the loading transfer means 123 in the loading position $P_2$, a pair of posts 132 extending upwardly at a spaced apart distance at the other end of the bottom plate 130 and a pair of support bars 133 horizontally suspended between an upper end of each of the posts 132 and an upper portion of the side plate 131. The spacing between the support bars 133 is set at a value slightly larger than the width of the small-sized press-formed parts 2a and 2b.

A mat 134 is affixed to the bottom plate 130 and formed of a material having a flexibility such as a rubber or a synthetic resin to have an infinite number of cirrus-like projections, and each of the support bars 133 is covered With a sheath 135 which is tubularly formed of a material having a flexibility such as a rubber or a synthetic resin to have an infinite number of cirrus like projections. The rising amount of the cirrus-like projections 137 is set to be relatively small, while the rising amount of hte cirrus-like like projections 138 is set to be relatively large.

With such carrier pallets 26a and 126b, each of the small-sized press-formed parts 2a and 2b in a substantially upright attitude can be stably held by virtue of the respective cirrus-like projections 137 and 138 of the mat 134 and the sheath 135.

The second transporting means 125 is an overhead conveyer disposed in parallel to the first transporting means 115' and includes a hanger 136 capable of hanging-down of a plurality of large-sized press formed parts 2c. The hanger 136 can be once stopped at the loading position $P_2$, and when the hanger 136 is in a stopped state, a plurality of large sized press-formed parts 2c are hung down on the hanger 136 by the loading means 114.

Figure 13:
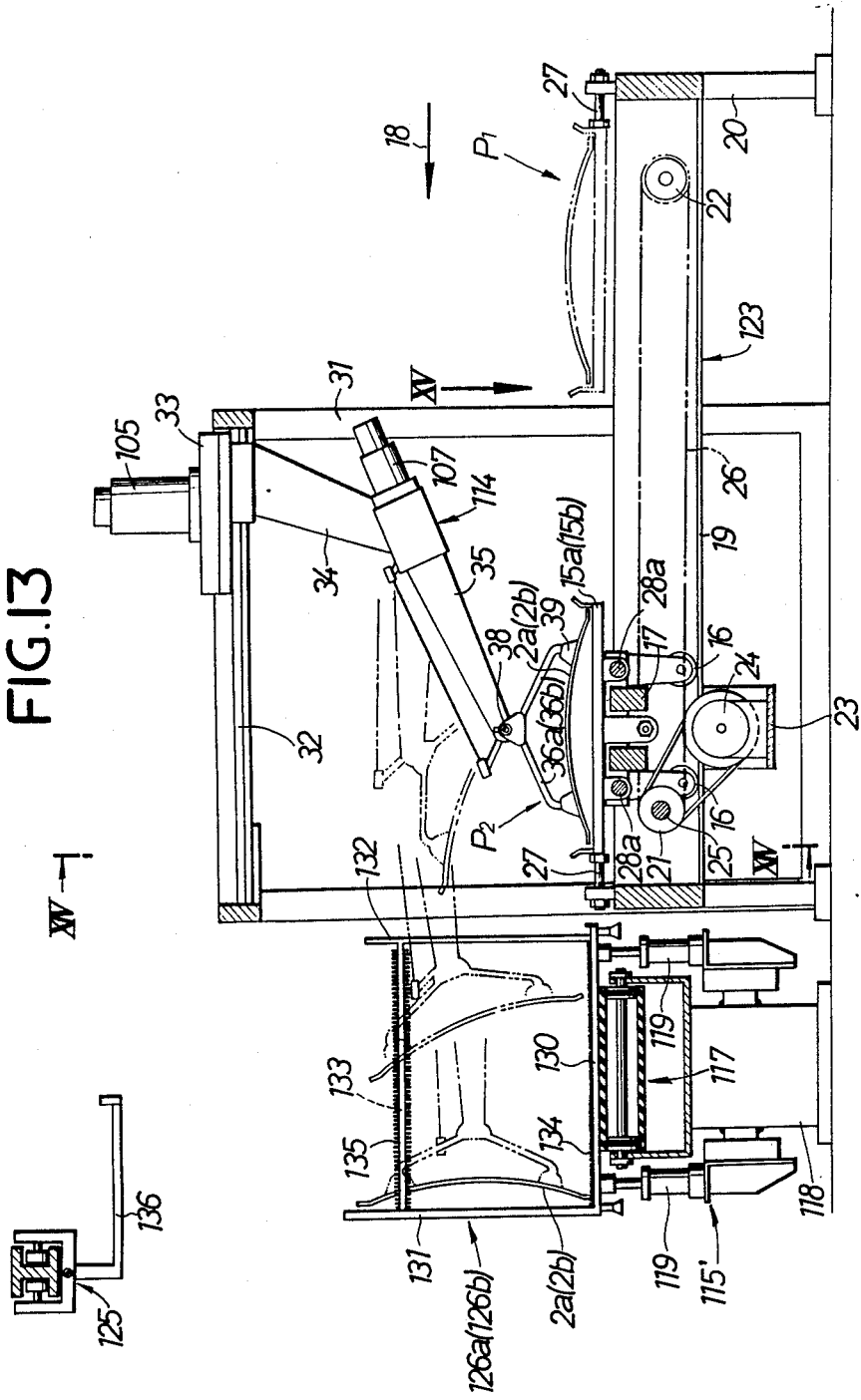
Figure 14:
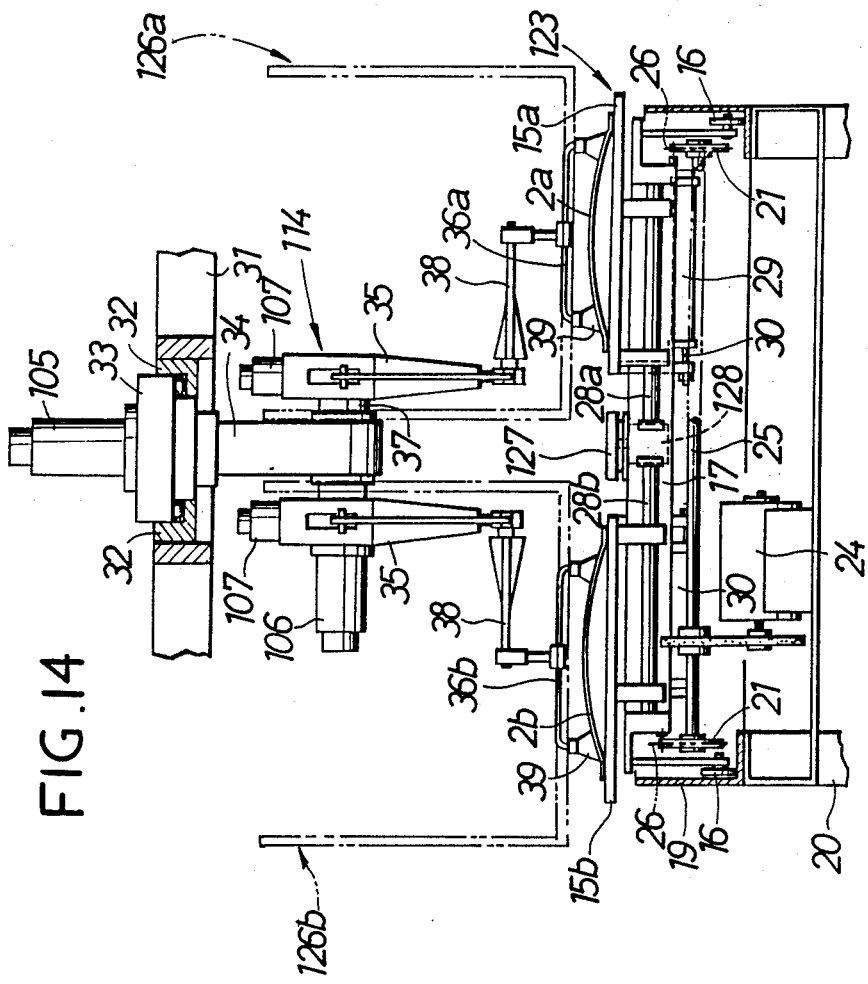
Figure 15:
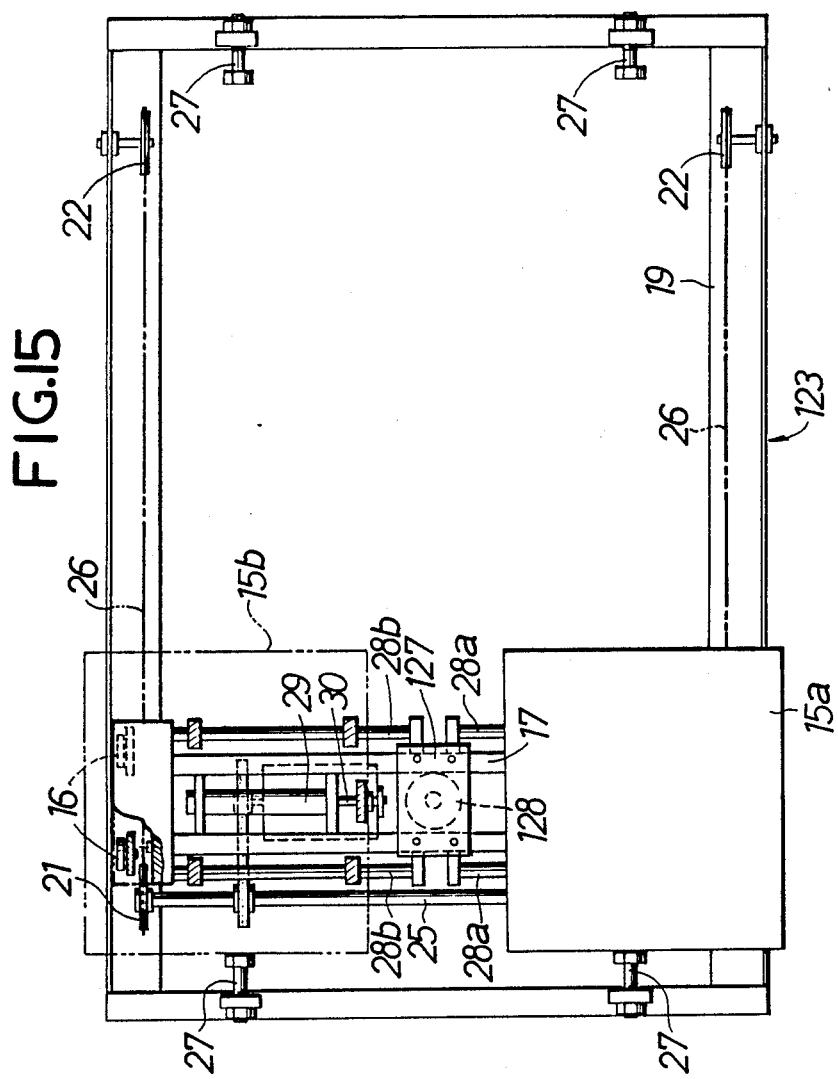
Figure 16:
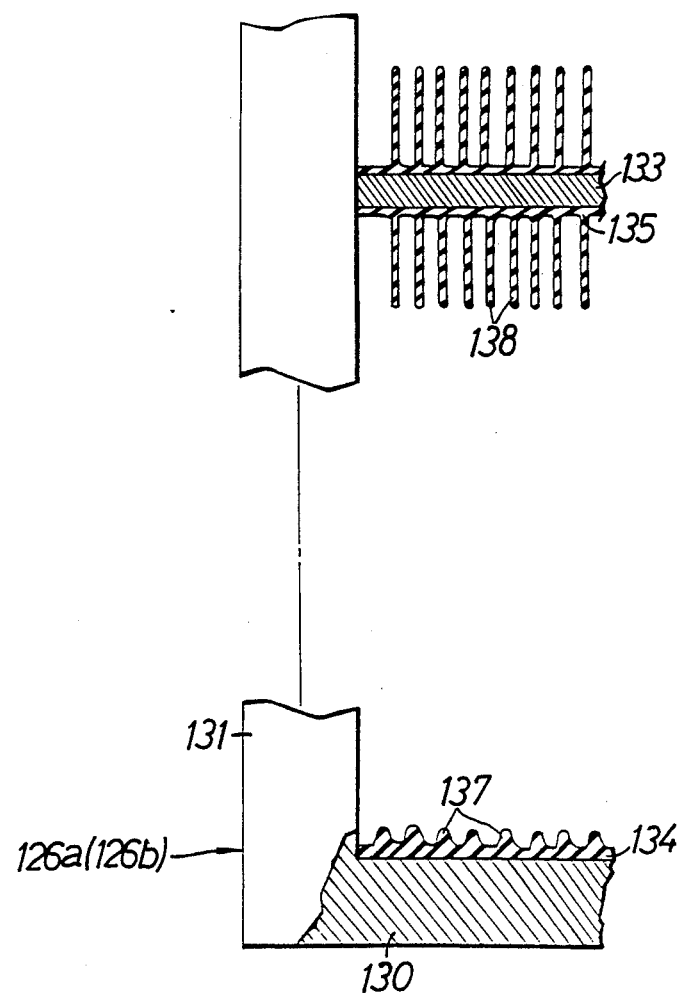
Figure 17:
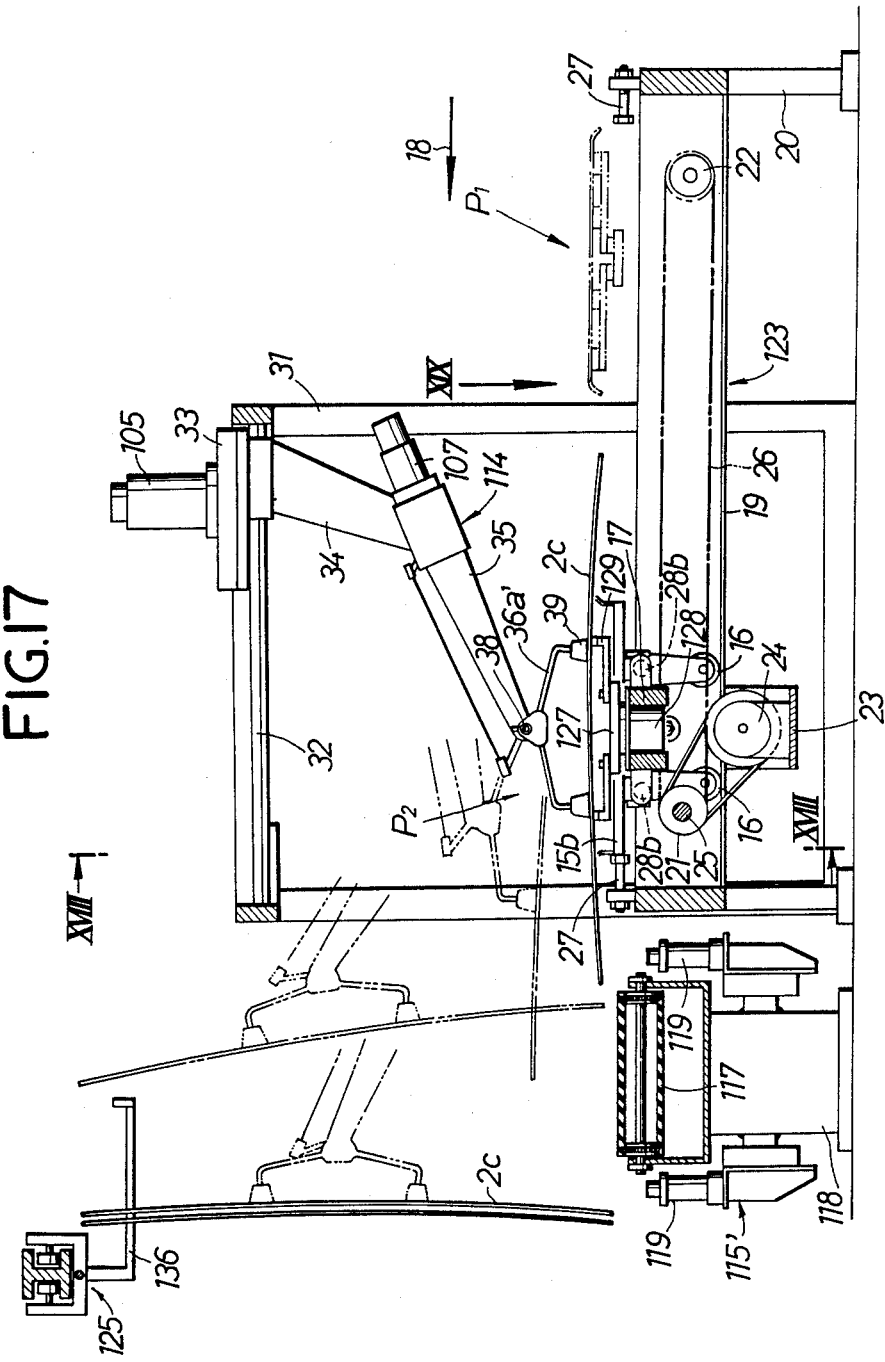
Figure 18:
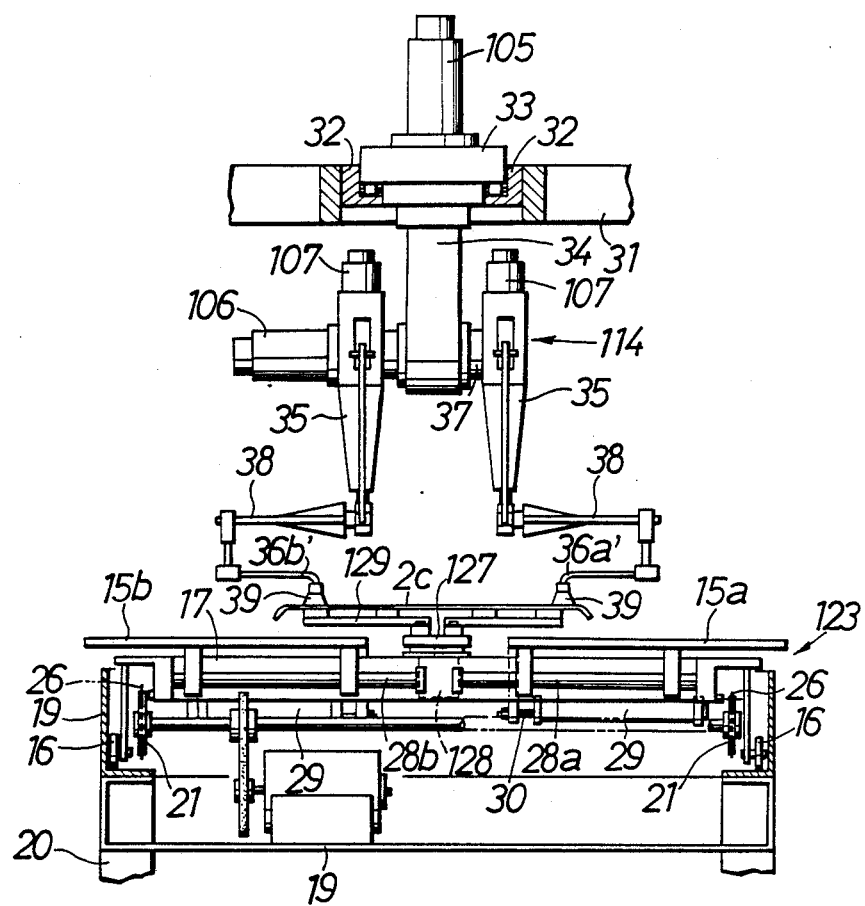

The operation of the third embodiment will be described below. In producing small-sized press-formed parts 2a and 2b in the continuously pressing machine , the receiving member 129 is removed from the turn member 127, and the fingers 36a and 36b are attached to the loading means 114, as shown in FIGS. 13 to 15.

The small sized press-formed parts 2a and 2b produced in the continuously pressing machine 1 are placed onto the transfer pallets 15a and 15b of the loading transfer means 123 and then carried from the ejection position $P_1$ to the loading position $P_2$ while being varied in spacing there-between. When a pair of the small sized parts 2a and 2b have been brought to the loading position $P_2$ in this manner, the loading means 114 is operated, causing the press-formed parts 2a and 2b to be loaded onto the carrier pallets 126a and 126b of the first transporting means 115' which is on standby in the loading position $P_2$. Specifically, each of the small sized press formed parts 2a and 2b is loaded onto the corresponding carrier pallet 126a, 126b in such a manner to be held by the respective cirrus like projections 137 and 138 of the mat 134 and the sheath 135.

In producing a large sized press formed part 2c in the continuously pressing machine 1, the receiving member 129 is attached to the turn member 127, and the fingers 36a ' and 36b' are attached to the loading means 114. The large-sized press-formed part 2c ejected in such condition to the ejection position $P_1$ is placed onto the receiving member 129 of the travel carriage 17 which is on standby in the ejection position $P_1$.

Figure 19:
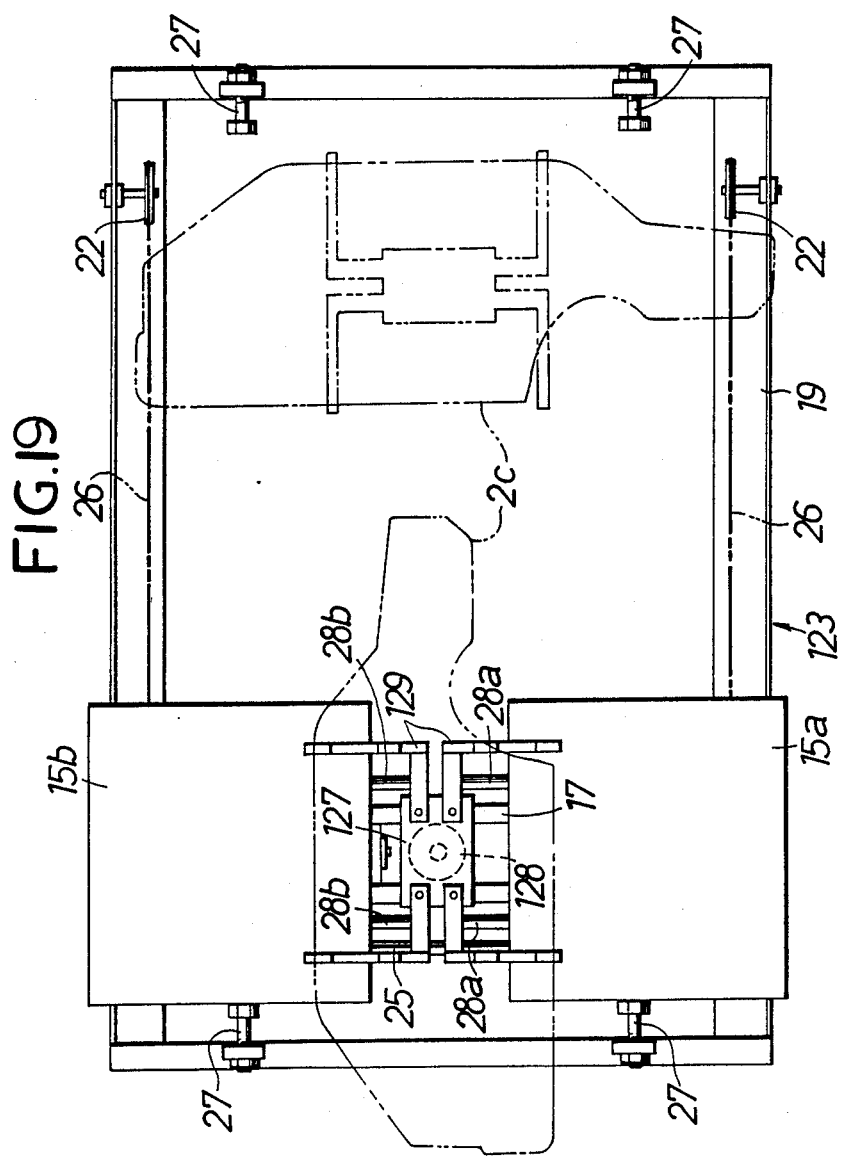
Figure 20:
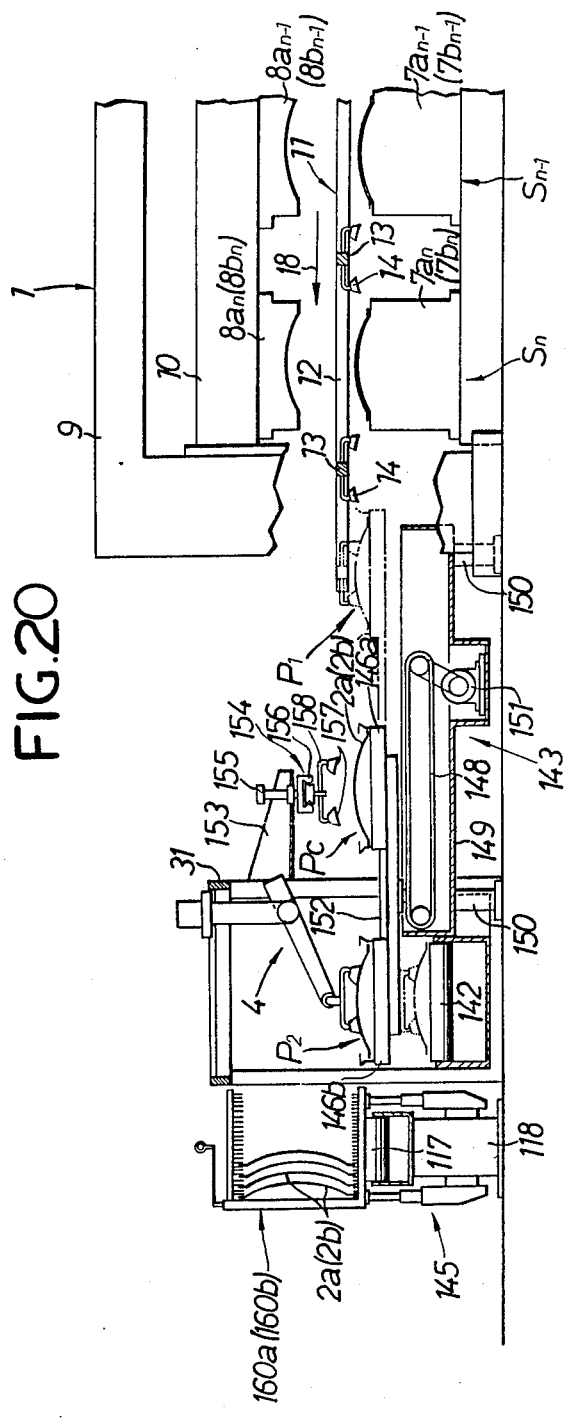
Figure 21:
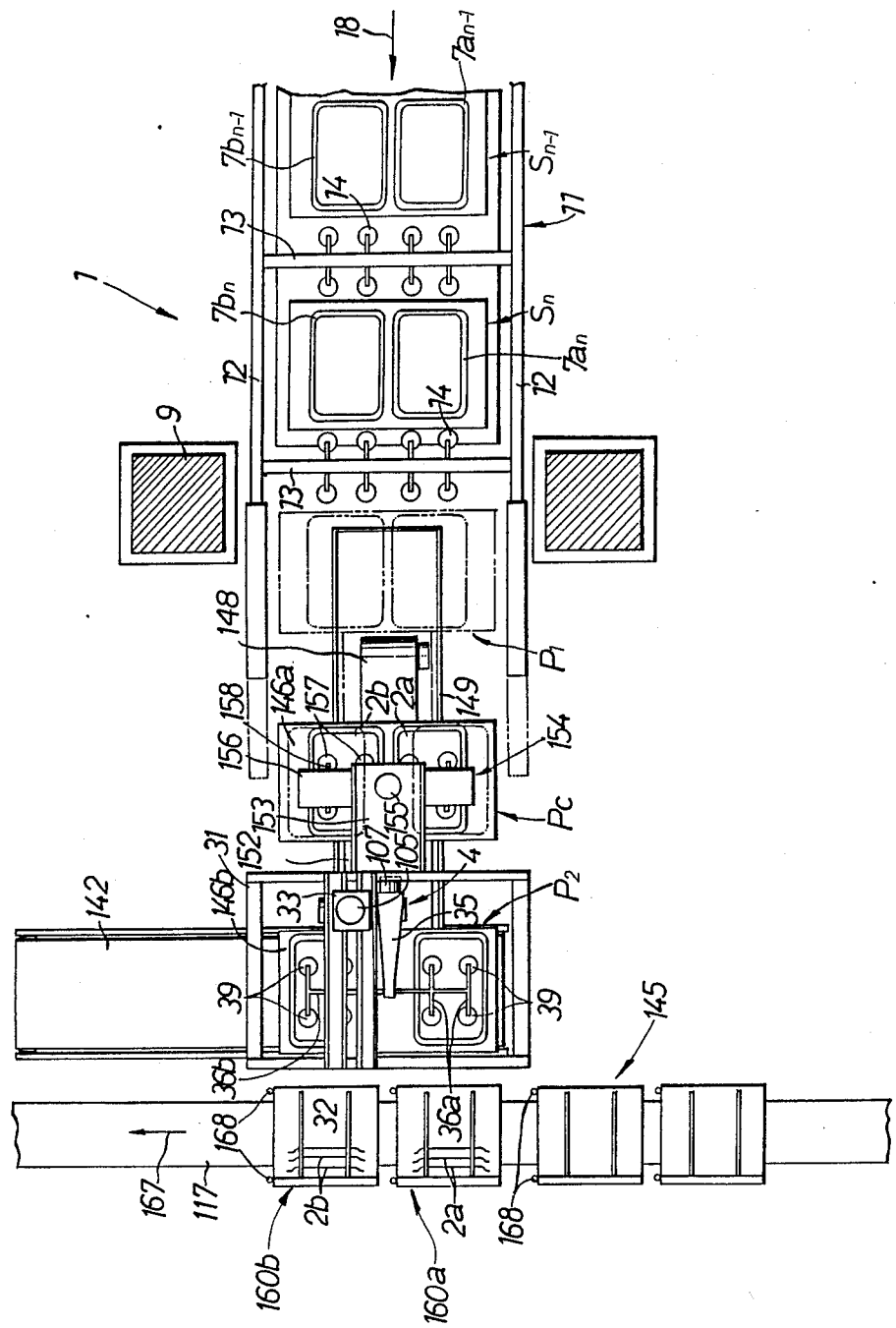
Figure 22:
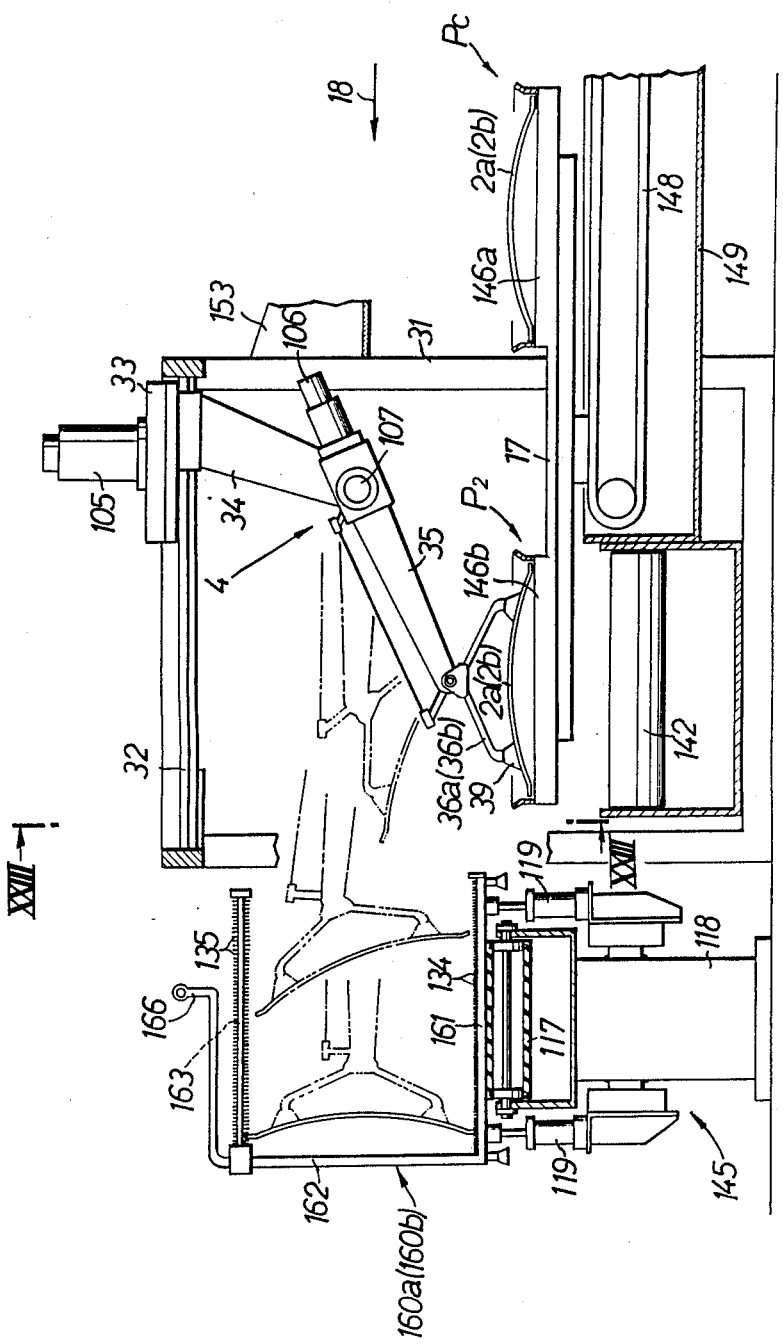
Figure 23:
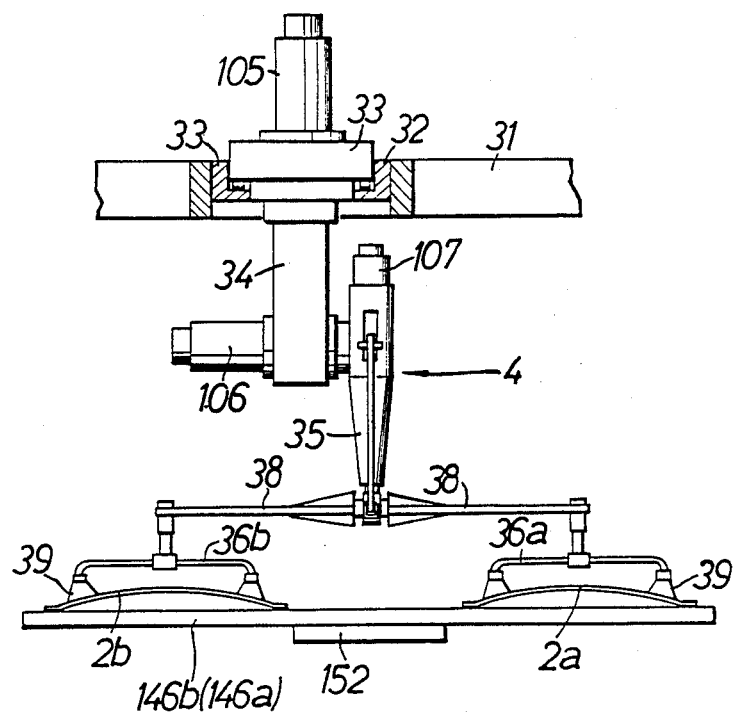

Thereupon, the large-sized press-formed part 2c can be transported to the loading position $P_2$ by travelling of the travel carriage 17 and in the middle of such transportation, it can be turned through 90 degree as shown by a chain line in FIG. 19, by turning the turn member 127. Thus, in the loading position $P_2$, the large-sized press-formed part 2c turned through 90 degree can be lifted up from the loading transfer means 123 by the loading means 114 and hung on the hanger 136 of the second transporting means 125.

In this manner, a pair of small-sized press-formed parts 2a and 2b can be simultaneously transferred from the ejection position $P_1$ to the loading position $P_2$ and loaded onto the first transporting means 115, and a single large-sized press-formed part 2c can be also transported, while being turned, from the ejection position $P_1$ to the loading position $P_2$ and loaded onto the second transporting means 125. A simple operation of only attaching and detaching of the receiving member 12 enables the transporting modes to be changed over.

FIGS. 20 to 23 illustrate a fourth embodiment of the present invention, wherein portions corresponding to those in the previous embodiments are denoted by the same reference characters.

press formed parts 2a and 2b made in the continuously pressing machine are sequentially transferred from the ejection position $P_1$ via a reloading position Pc to the loading position $P_2$ by the loading transfer means 143. The press-formed parts 2a and 2b which have reached the loading position $P_2$ are loaded onto the transporting means 145 by the loading means 4 and transported out, but a part of the press-formed parts 2a and 2b may be withdrawn from the loading position $P_2$ onto a withdrawing and inspecting conveyer 142.

The ejection position $P_1$ and the loading position $P_2$ are established on one straight line extending in the transfer direction 18, and the reloading position Pc is established at a central portion between the both positions $P_1$ and $P_2$. The loading transfer means 143 is disposed to extend between the ejection position $P_1$ and the loading position $P_2$ with the reloading position pc intervening as a middle position therebetween.

The loading transfer means 143 comprises a first transfer pallet 146a movable with the press-formed parts 2a and 2b placed thereon between the ejection position $P_1$ and the reloading position Pc, a second transfer pallet 146b movable with the press-formed parts 2a and 2b placed thereon between the reloading position Pc and the loading position $P_2$ and operatively associated with the first transfer pallet 146a. These transfer pallets 146a and 146b are formed so that a pair of press-formed parts 2a and 2b ejected in parallel from the continuously pressing machine 1 can be placed in parallel thereon.

A reciprocally travellable conveyer 148 is disposed on a frame 149 supported on a floor surface through support legs 150 with opposite ends thereof disposed respectively between the ejection position $P_1$ and the reloading position Pc and between the reloading position Pc and the loading position $P_2$. A reversible motor 151 is contained in and fixed to a lower portion within the frame 149 and connected to the conveyer 148.

The first and second transfer pallets 146a and 146b are interconnected through a connecting member 152 which is connected to the 148. This permits the transfer pallets 146a and 246b to be reciprocally moved in an interlocking manner by reciprocally driving the conveyer 148, wherein the second transfer pallet 146b is in the reloading position Pc when the first transfer pallet 146a is in the ejection position $P_1$, while the second transfer pallet 146b is in the loading position $P_2$ when the first transfer pallet 146a is in the reloading position Pc.

The support 31 provided at the loading position $P_2$ to place the loading means 4 is provided with an arm 153 which extends so as to lie above the first transfer pallet 146a or second transfer pallet 146b which is in the reloading position Pc, and reloading means 154 is disposed at a leading end of the arm 153.

The reloading means 154 comprises a lifting cylinder 155 fixed and supported on the leading end of the arm 153 to have a vertical axis, a lifter 156 connected to the lifting cylinder 155, a pair of fingers 158 carried on the lifter 156 for movement in a horizontal direction perpendicular to the transfer direction 18, and a drive motor (not shown) for driving the fingers 158. The fingers 158 correspond to a pair of press-formed parts 2a and 2b and each include a plurality of suckers 157— each adapted to releasably hold the press-formed part 2a, 2b.

The reloading means 154 enables a pair of press-formed parts 2a and 2b to be lifted up from the first transfer pallet 146a which has been moved from the ejection position $P_1$ to the reloading position Pc and to be lowered and placed onto the second transfer pallet 146b which has been moved in an empty state from the loading position $P_2$ to the reloading position Pc. Moreover, the movement of the pair of fingers 158 in a horizontal direction perpendicular to the transfer direction 18 enables the press-formed parts 2a and 2b to be placed onto the second transfer pallet 146b at a spaced apart distance larger than the distance between the pair of press-formed parts 2a and 2b which have been placed on the first transfer pallet 146a.

A withdrawing and inspecting conveYer 142 is disposed below ±he second transfer pallet 146b assuming the loading position $P_2$ to extend in a direction perpendicular to the transfer direction 18.

The transporting means 145 comprises a transporting conveyer 117 supported on a rest 118, and carrier pallets 160a and 160b adapted to be placed onto the transporting conveyer 117. Each of the carrier pallets 160a and 160b comprises a bottom plate 161, a side plate 162 raised at a right angle on one end of the bottom plate 161, and a plurality of support bars 163 fixed to an upper portion of the side plate 162 so that they are horizontally disposed above the bottom plate 161. The spacing between the bottom plate 161 and each of the support bars 163 may be determined such that the press formed parts 2a and 2b assuming a vertical attitude can be inserted between the bottom plate 161 and the support bar 163.

A mat 134 having an infinite number of cirrus-like projections is bonded to an upper surface of the bottom plate 161, and the support bar 163 is covered with a sheath 35 having an infinite number of cirrus-like projections. An engage hook 166 is fixedly mounted on an upper portion of the side plate 162 and enables the carrier pallets 160a and 160b to be hung up from and down onto the transporting conveyer 117.

In such carrier pallets 160a and 160b, the press formed parts 2a and 2b may be inserted into and withdrawn from between an leading end of the support bar 163 and the bottom plate 161, and the empty carrier pallets 160a and 160b containing no press-formed parts 2a and 2b are placed onto the transporting conveyer 17 in the rear of or upstream the loading position $P_2$ in the transfer direction 167 with the leading end of the support bar 163 turned to the loading portion $P_2$. Further, positioning stoppers 168 are disposed at locations corresponding to the loading position $P_2$ for movement between an engaged position and a disengaged position and adapted to engage the pair of carrier pallets 160a and 160b at a front end in the transporting direction 167 to position such carrier pallets 160a and 160b.

In the rear of or downstream the loading position P₂ in the transporting direction 167, similar positioning stoppers 168 are also disposed at a distance spaced apart in the transporting direction 67 in order that when a pair of carrier pallets 160a and 160b have been positioned and fixed, the succeeding carrier pallets 160a and 160b are avoided from travelling to collide against the preceding carrier pallets 160a and 160b as they travel.

The operation of the fourth embodiment will be described below. A pair of press-formed parts 2a and 2b formed in the final forming station Sn in the continuously pressing machine 1 are ejected in Parallel to the ejection position P₁, and in this case, the empty first transfer pallet 146a in the loading transfer means 143 is on standby in the ejection position P₁, and the ejected pair of press-formed parts 2a and 2b are placed onto the first transfer pallet 146a. The first transfer pallet 146a with the press-formed parts 2a and 2b placed thereon is moved from the ejection position P₁ to the reloading position Pc where they are lifted from the first transfer pallet 146a by the reloading means 154. Then, the first transfer pallet 146a is returned to the ejection position P₁ to receive press-formed parts 2a and 2b which will be subsequently ejected, while the second transfer pallet 146b is correspondingly moved to the reloading position Pc.

When the second transfer pallet 146b has been moved to the reloading position Pc, the fingers 58 of the reloading means 154 are lowered, and the lifted Press-formed parts 2a and 2b are placed onto the second transfer pallet 146b. This results in that the press formed parts 2a and 2b have been reloaded from the first transfer pallet 146a onto the second transfer pallet 146b. Moreover, in the reloading means 154, the spacing between the Press-formed parts 2a and 2b when lifted is increased to correspond to the spacing between the carrier pallets 160a and 160b in the transporting means 145. Thus, when the press-formed parts 2a and 2b have been reloaded from the first transfer pallet 146a onto the second transfer pallet 146b, the spacing between them has been increased.

The second transfer pallet 146b with the press-formed parts 2a and 2b placed thereon are moved from the reloading position Pc to the loading position P₂, and during this time, the first transfer pallet 146a with newly ejected press-formed parts 2a and 2b placed thereon is moved from the ejection position P₁ to the reloading position Pc.

On the other hand, in the transporting means 145, a pair of carrier pallets 160a and 160b are positioned and fixed in parallel in a location corresponding to the loading position P₂ by the action of the cylinders 19 and the Positioning stoppers 168. With the pair of carrier pallets 160a and 160b fixedly positioned in correspondence to the loading position P₂ in this manner, the loading means 4 is operated, causing the press formed parts 2a and 2b lying on second transfer pallet 146b to be loaded onto the carrier pallets 160a and 160b.

Repeating of such procedure allows a plurality of press-formed parts 2a and 2b to be sequentially loaded in vertical attitudes spaced apart from one another onto the carrier pallets 160a and 160b which are in locations corresponding to the loading position P₂. Moreover, the vertical attitudes of the individual press formed parts 2a and 2b are stably maintained by the respective cirrus like projections of the mat 134 and the sheath 135 and hence, the press-formed parts 2a, 2b cannot be damaged due to the mutual contact.

Now, in withdrawing and inspecting a part of the press-formed parts 2a and 2b, the press-formed parts 2a and 2b lifted from the second transfer pallet 146b in the loading position P₂ by the loading means 4 may be lowered onto the withdrawing and inspecting conveyer 142 when the second transfer pallet 146b has been moved from the loading position P₂ to the reloading position Pc. If doing so. the press-formed parts 2a and 2b may be withdrawn outside from the loading position P₂ as a result of travelling of the withdrawing and inspecting conveyer 142.

The relatively simple construction such that the transfer pallets 146a and 146b may be reciprocally moved a short distance between the ejection position P₁ and the reloading position Pc as well as between the reloading position pc and the loading position P₂ in this manner enables a rapid and efficient transportation of press-formed parts 2a and 2b from the ejection position P₁ to the loading position P₂. Furthermore, variation of the spacing between the press-formed parts 2a and 2b by the reloading means 154 ensures that such spacing can be adjusted to correspond to the spacing between the carrier pallets 160a and 160b when the press-formed parts 2a and 2b have been transported to the loading position P₂, irrespective of a smaller spacing between the press-formed parts 2a and 2b ejected to the ejection position P₁ than the spacing between the carrier pallets 160a and 160b of the transporting means 145.

What is claimed is:

1. A system for removing press-formed parts formed in a pressing machine from said pressing machine, comprising loading transfer means disposed between an ejection position to which a plurality of press-formed parts are simultaneously ejected in parallel from said pressing machine and a pallet loading position established to simultaneously load said press-formed parts onto each pallet of a plurality of carrier pallets which are on standby in parallel to individually correspond to the plurality of press-formed parts to be removed, said loading transfer means comprising a plurality of transfer pallets connected to one another with variable spacing therebetween and reciprocally movable in parallel between the ejection position and the pallet loading position for simultaneously receiving a plurality of press-formed parts from said pressing machine and for simultaneously placing individual of said press formed parts on individual of said transfer pallets, and spacing-varying drive means for varying said spacing between said individual of said transfer pallets while the press-formed parts are transferred between said ejection position and said pallet loading position.

2. A system for removing press-formed parts according to claim 1 wherein loading means is disposed in said loading position for loading said press-formed parts from said transfer pallet of said loading transfer means onto a carrier pallet of said plurality of carrier pallets.

3. A system for removing press-formed parts according to claim 2, wherein said loading means includes finger means corresponding to said plurality of carrier pallets and each provided with a plurality of suckers each adapted to releasably hold a press-formed part.

4. A system for removing press-formed parts according to claim 1, wherein said plurality of transfer pallets of said loading transfer means are positioned on a travel carriage which is movable to reciprocate between said ejection position and said loading position.

5. A system for removing press-formed parts according to claim 1, further including transporting means disposed in said loading position and extending in a direction perpendicular to said load transfer means, said transporting means being arranged for moving said plurality of carrier pallets to and stopping said carrier pallets at said loading position.

6. A system for removing press-formed parts according to claim 1, wherein said carrier pallets are vertically movable in said loading position.

* * * * *